(12) United States Patent
Bookbinder et al.

(10) Patent No.: US 8,588,568 B2
(45) Date of Patent: Nov. 19, 2013

(54) BEND LOSS RESISTANT MULTI-MODE FIBER

(75) Inventors: Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 68 days.

(21) Appl. No.: 13/289,029

(22) Filed: Nov. 4, 2011

(65) Prior Publication Data

US 2013/0114935 A1    May 9, 2013

(51) Int. Cl.
G02B 6/02    (2006.01)
(52) U.S. Cl.
USPC ............................ 385/124; 385/126; 385/128
(58) Field of Classification Search
USPC .................................................. 385/123–128
See application file for complete search history.

(56) References Cited

U.S. PATENT DOCUMENTS

| | | | |
|---|---|---|---|
| 4,111,525 A | 9/1978 | Kaminow et al. |
| 4,222,631 A | 9/1980 | Olshansky |
| 7,315,677 B1 | 1/2008 | Li et al. |
| 7,406,235 B2 | 7/2008 | Guan et al. |
| 7,421,174 B2 | 9/2008 | Fleming, Jr. et al. |
| 7,450,806 B2 | 11/2008 | Bookbinder et al. |
| 7,787,731 B2 | 8/2010 | Bookbinder et al. |
| 8,111,961 B2 | 2/2012 | DiGiovanni et al. |
| 2009/0154888 A1 | 6/2009 | Abbott, III et al. |
| 2009/0169163 A1 | 7/2009 | Abbott, III et al. |
| 2010/0254653 A1 | 10/2010 | Molin et al. |

FOREIGN PATENT DOCUMENTS

| | | |
|---|---|---|
| EP | 1503230 | 2/2005 |
| EP | 1515169 | 3/2005 |
| EP | 2096088 A1 | 9/2009 |
| WO | WO2009/054715 | 4/2009 |
| WO | WO2010/036684 | 4/2010 |

OTHER PUBLICATIONS

Olshansky, R, "Mode coupling effects in graded-index optical fibers", Applied Optics vol. 14, Issue 4, pp. 935-945, Apr. 1, 1975.
Olshansky, R, "Multiple-∝ index profile", Applied Optics vol. 18, Issue 5, pp. 683-689, Mar. 1, 1979.
U.S. Appl. No. 13/289,021, filed Nov. 4, 2011, titled "GE-P Co-Doped Multimode Optical Fiber".
Feb. 21, 2013 International Search Report issued in counterpart application No. PCT/US2012/062725.
Jan. 25, 2013 International Search Report issued in related application No. PCT/US2012/062719.

*Primary Examiner* — Charlie Peng
*Assistant Examiner* — Mary El Shammaa
(74) *Attorney, Agent, or Firm* — Svetlana Short

(57) ABSTRACT

A graded index multimode optical fiber comprising: (a) a silica core doped with germania, and at least one co-dopant, comprising one of $P_2O_5$ or F or $B_2O_3$, the core extending to outermost core radius, $r_1$ and having a dual alpha, $\alpha_1$; (b) a low index inner cladding surrounding the core and off-set from said core; (c) an outer cladding surrounding and in contact with the inner cladding, such that at least the region of the inner cladding off-set from said core has a lower refractive index than the outer cladding. The center germania concentration at the centerline, $C_{Ge1}$, is greater than or equal to 0, and an outermost germania concentration in the core $C_{Ge2}$, at $r_1$ is greater than or equal to 0. The core has a center co-dopant concentration at the centerline, $C_{c-d1}$, greater than or equal to 0, and an outermost co-dopant concentration $C_{c-d2}$, at $r_1$, wherein $C_{c-d2}$ is greater than or equal to 0.

20 Claims, 6 Drawing Sheets

BEND LOSS RESISTANT MULTI-MODE FIBER

BACKGROUND

The disclosure relates generally to optical fibers, and particularly to graded index multimode fibers, and more particularly to graded index germania multimode fibers that have graded index cores codoped with Ge and another dopant and that exhibit low bend losses.

SUMMARY

Some embodiments of the disclosure relate to optical fibers with germania ($GeO_2$) and another dopant in the core of the fiber.

According to at least one embodiment a graded index multimode optical fiber comprises:

(a) a core comprising silica doped with germania and at least one co-dopant, c-d, the co-dopant comprising one of $P_2O_5$ or F or $B_2O_3$, the core extending from a centerline at r=0 to an outermost core radius, $r_1$ and having a dual alpha, $\alpha_1$ and $\alpha$;

(b) an inner cladding surrounding and in contact with the core;

(c) an outer cladding surrounding and in contact with the inner cladding, at least a portion of the inner cladding having a lower refractive index than the outer cladding; and the germania is disposed in the core with a germania dopant concentration profile, $C_{Ge1}(r)$, and the core has a center germania concentration at the centerline, $C_{Ge1}$, greater than or equal to 0, and an outermost germania concentration $C_{Ge2}$, at $r_1$, wherein $C_{Ge2}$, is greater than or equal to 0; and wherein the co-dopant is disposed in the core with a co-dopant concentration profile, $C_{c-d}(r)$, and the core has a center co-dopant concentration at the centerline, $C_{c-d1}$, greater than or equal to 0, and an outermost co-dopant concentration $C_{c-d2}$, at $r_1$, wherein $C_{c-d2}$ is greater than or equal to 0; and $C_{Ge}(r)=C_{Ge1}-(C_{Ge1}-C_{Ge2})(1-x_1)r^{\alpha 1}-(C_{Ge1}-C_{Ge2})x_1 r^{\alpha 2}$;
$C_{c-d}(r)=C_{c-d1}-(C_{c-d1}-C_{c-d2})x_2 r^{\alpha 1}-(C_{c-d1}-C_{c-d2})(1-x_2)r^2$;
$1.8 \le_1 \le 2.4$, $1.8 \le a_2 \le 3.1$; and $-10 \le x_1 \le 10$ and $-10 \le x_2 \le 10$.

According to some embodiments a graded index multimode optical fiber comprises:

a core comprising silica doped with germania and at least one co-dopant, c-d, the co-dopant comprising one of $P_2O_5$ or F or $B_2O_3$, the core extending from a centerline at r=0 to an outermost core radius, $r_1$ and having a dual alpha, $\alpha_1$ and $\alpha$;

(b) an inner cladding surrounding and in contact with the core;

(c) an outer cladding surrounding and in contact with the inner cladding, at least one region of the inner cladding having a lower refractive index than the outer cladding and being off-set from said core; and the germania is disposed in the core with a germania dopant concentration profile, $C_{Ge1}(r)$, and the core has a center germania concentration at the centerline, $C_{Ge1}$, greater than or equal to 0, and an outermost germania concentration $C_{Ge2}$, at $r_1$, wherein $C_{Ge2}$, is greater than or equal to 0; and wherein the co-dopant is disposed in the core with a co-dopant concentration profile, $C_{c-d}(r)$, and the core has a center co-dopant concentration at the centerline, $C_{c-d1}$, greater than or equal to 0, and an outermost co-dopant concentration $C_{c-d2}$, at $r_1$, wherein $C_{c-d2}$ is greater than or equal to 0; and $C_{Ge}(r)=C_{Ge1}-(C_{Ge1}-C_{Ge2})(1-x_1)r^{\alpha 1}-(C_{Ge1}-C_{Ge2})x_1 r^{\alpha 2}$;
$C_{c-d}(r)=C_{c-d1}-(C_{c-d1}-C_{c-d2})x_2 r^{\alpha 1}-(C_{c-d1}-C_{c-d2})(1-x_2)r^2$;
$1.8 <_1 < 2.4$, $1.8 < \alpha_2 < 3.1$; and $-10 < x_1 < 10$ and $-10 < x_2 < 10$.

According to some embodiments the graded index multimode optical fiber comprises:

a core comprising silica doped with germania and at least one co-dopant, c-d, the co-dopant comprising $B_2O_3$, the core extending from a centerline at r=0 to an outermost core radius, $r_1$ and having a dual alpha, $\alpha_1$ and $\alpha$;

(b) an inner cladding surrounding and in contact with the core;

(c) an outer cladding surrounding and in contact with the inner cladding, at least one region of the inner cladding having a lower refractive index than the outer cladding; and the germania is disposed in the core with a germania dopant concentration profile, $C_{Ge1}(r)$, and the core has a center germania concentration at the centerline, $C_{Ge1}$, greater than or equal to 0, and an outermost germania concentration $C_{Ge2}$, at $r_1$, wherein $C_{Ge2}$, is greater than or equal to 0; and wherein the co-dopant is disposed in the core with a co-dopant concentration profile, $C_{c-d}(r)$, and the core has a center co-dopant concentration at the centerline, $C_{c-d1}$, greater than or equal to 0, and an outermost co-dopant concentration $C_{c-d2}$, at $r_1$, wherein $C_{c-d2}$ is greater than or equal to 0; and $C_{Ge}(r)=C_{Ge1}-(C_{Ge1}-C_{Ge2})(1-x_1)r^{\alpha 1}-(C_{Ge1}-C_{Ge2})x_1 r^{\alpha 2}$;
$C_{c-d}(r)=C_{c-d1}-(C_{c-d1}-C_{c-d2})x_2 r^{\alpha 1}-(C_{c-d1}-C_{c-d2})(1-x_2)r^2$;
$1.8<_1<2.4$, $1.8<\alpha_2<3.1$; and 31 $10<x_1<10$ and $-10<x_2<10$.

Preferably, the silica based cladding region surrounding the core has refractive index lower than that of pure silica. In some embodiments this silica based region is down-doped with F and/or B and may optionally include Ge. In some embodiments, this silica based cladding region includes random or non-periodically distributed voids (for example filled with gas).

In some embodiments the core comprises about 200 to 2000 ppm by wt. Cl, and less than 1.2 wt. % of other index modifying dopants.

Preferably, the fiber has a numerical aperture NA between about 0.185 and 0.25 (e.g., $0.185 \le NA \le 0.23$, or $0.185 \le NA \le 0.215$, or $0.195 \le NA \le 0.225$, or $2 \le NA \le 2.1$) and a bandwidth greater than 2 GHz-Km at a at least one wavelength within 800 nm and 900 nm.

According to one embodiment a gradient index multimode fiber comprises: (i) a silica based core (with at least one core region) co-doped with $GeO_2$ and about 1 to 9 mole % $P_2O_5$, and about 200 to 2000 ppm by wt. Cl, and less than 1 wt. % of other index modifying dopants; the core having a dual alpha, $\alpha_1$ and $\alpha_2$, where $1.8 \le \alpha_1 \le 2.25$ and $1.9 \le \alpha_2 \le 2.25$ at least one wavelength in the wavelength range between 840 and 1100 nm, preferably at 850 nm; and (ii) a silica based region surrounding the core region comprising F and optionally $GeO_2$ and having a refractive index lower than that of silica. The fiber has a numerical aperture between 0.185 and 0.215.

According to some embodiments the multimode fiber comprises: (i) a silica based core co-doped with $GeO_2$ and about 0.5 to 10 mole % $P_2O_5$ (and preferably 1 to 8 mole %), and less than 1 wt. % of other index modifying dopants; the core having a dual alpha, $\alpha_1$ and $\alpha_2$, where $1.8 \le \alpha_1 \le 3.4$ and $1.9 \le \alpha_2 \le 2.4$ at least one wavelength in the wavelength range between 840 and 1100 nm, (preferably at 850 nm) and a physical core diameter, Dc where $Dc=2R_1$ and wherein $25 \leq Dc \leq 55$ microns, and in some embodiments $25 \leq Dc \leq 45$ microns; and (ii) a silica based cladding region that (a) surrounds the core and comprises F and optionally $GeO_2$ and (b) has a refractive index lower than that of silica. The fiber 10 has a numerical aperture between 0.185 and 0.215; a bandwidth greater than 2 GHz-Km at least one wavelength situated in a range of 800 and 900 nm.

According to some embodiments the multimode fiber comprises: (i) a silica based core co-doped with $GeO_2$ and about 0.5 to 10 mole% $P_2O_5$ (and preferably 1 to 8 mole%), and less than 1 wt. % of other index modifying dopants; the core having a dual alpha, $\alpha_1$ and $\alpha_2$, where $1.8 \leq \alpha_1 \leq 2.4$ and $1.9 \leq \alpha_2 \leq 2.4$ at least one wavelength in the wavelength range between 840 and 1100 nm, (preferably at 850 nm) and a physical core diameter, Dc where $Dc=2R_1$ and wherein $45 \leq Dc \leq 55$ microns; and (ii) a silica based cladding region that (a) surrounds the core and comprises F and optionally $GeO_2$ and (b) has a refractive index lower than that of silica. The fiber 10 has a numerical aperture between 0.185 and 0.215; a bandwidth greater than 2 GHz-Km at least one wavelength situated in a range of 800 and 900 nm.

According to some embodiments the multimode fiber The fiber 10 has a numerical aperture between 0.185 and 0.25 (e.g., $0.195 \leq NA \leq 2.25$); a bandwidth greater than 2 GHz-Km at least one wavelength situated in a range of 800 nm and 900 nm and a bandwidth greater than 2 GHz-Km at least one wavelength situated in a range of 900 nm and 1300 nm.

According to at least some embodiments the multimode fiber has a graded index core and provides a bandwidth characterized by a first peak wavelength $\lambda p_1$ situated in a range 800 and 900 nm and a second peak wavelength $\lambda p_2$ situated in a wavelength range of 950 to 1700 nm. According to some embodiments the multimode fiber provides a bandwidth characterized by $\lambda p_1$ situated in a range 800 nm and 900 nm and $\lambda p_2$ situated in a range of 950 to 1670 nm.

According to some embodiments the multimode fiber has a graded index core. Each of the dual dopants, germania and the codopant, are disposed in the core of the multimode fiber in concentrations which vary with radius and which are defined by two alpha parameters, $\alpha_1$ and $\alpha_2$. That is, the germania dopant concentration varies with radius as a function of the alpha parameters, $\alpha_1$ and $\alpha_2$, as does the co-dopants dopant concentration. The dual dopant concentrations disclosed herein also reduce the sensitivity with wavelength of the overall $\alpha$ shape of the refractive index of the optical fiber, which can help increase the productivity yield of such fibers during their manufacture, thereby reducing waste and costs. As used herein, the term graded index refers to a multimode optical fiber with a refractive index having an overall dual alpha, $\alpha_1$ and $\alpha_2$, where $1.8 \leq \alpha_1 \leq 2.4$ and $1.9 \leq \alpha_2 \leq 2.4$ at least one wavelength in the wavelength range between 840 and 1100 nm, preferably at 850 nm.

In some embodiments, the MMF disclosed herein comprises a refractive index profile which provides an RMS pulse broadening of less than 0.2 ns/km (less than about 2 GHz-km) over wavelength window width of at least 0.04 µm, preferably at least 0.05 µm, more preferably at least 0.10 µm, and even more preferably at least 0.15 µm, wherein the window is centered at about 0.85 µm. In some embodiments, an RMS pulse broadening of less than 0.2 ns/km is provided over a wavelength window width of at least 0.20 µm, and the window is preferably centered at a wavelength in the 0.8 to 0.9 µm range (e.g., at about 0.85 µm).

In some embodiments, the MMF disclosed herein comprises a refractive index profile which provides an RMS pulse broadening of less than 0.02 ns/km over wavelength window width of at least 0.04 µm, preferably at least 0.05 µm, more preferably at least 0.10 µm, and even more preferably at least 0.15 µm, wherein the window is centered at about 0.85 µm. In some embodiments, an RMS pulse broadening of less than 0.02 ns/km is provided over a wavelength window width of at least 0.20 µm, and the window is preferably centered at a wavelength in the 0.8 to 0.9 µm range (e.g., at about 0.85 µm).

In some embodiments, the MMF disclosed herein comprises a refractive index profile which provides a bandwidth greater than 2 GHz-Km over wavelength window width of at least 0.04 µm, preferably at least 0.05 µm, more preferably at least 0.10 µm, and even more preferably at least 0.15 µm, wherein the window is centered at about 0.85 µm. In some embodiments, an RMS pulse broadening of less than 0.2 ns/km is provided over a wavelength window width of at least 0.20 µm, and the window is preferably centered at a wavelength in the 0.8 to 0.9 µm range (e.g., at about 0.85 µm). In these embodiments the core preferably has a graded index profile.

In some embodiments, the MMF disclosed herein comprises a refractive index profile which provides a bandwidth greater than 4 GHz-Km over wavelength window width of at least 0.04 µm, preferably at least 0.05 µm, more preferably at least 0.10 µm, and even more preferably at least 0.15 µm, wherein the window is centered at about 0.85 µm. In some embodiments, an RMS pulse broadening of less than 0.2 ns/km is provided over a wavelength window width of at least 0.20 µm, and the window is preferably centered at a wavelength in the 0.8 to 0.9 µm range (e.g., at about 0.85 µm). In these embodiments the core preferably has a graded index profile.

In some embodiments, the MMF disclosed herein comprises a refractive index profile which provides a bandwidth greater than 2 GHz-Km at 0.85 µm, and a bandwidth greater than 0.75 GHz-Km at 0.98 µm. In some embodiments, the MMF disclosed herein comprises a refractive index profile which provides a bandwidth greater than 2 GHz-Km at 0.85 µm, and a bandwidth greater than 1.5 GHz-Km at 0.98 µm. In some embodiments, the MMF disclosed herein comprises a refractive index profile which provides a bandwidth greater than 2 GHz-Km at 0.85 µm, and a bandwidth greater than 2 GHz-Km at 0.98 µm. In some embodiments, the MMF disclosed herein comprises a refractive index profile which provides a bandwidth greater than 2 GHz-Km at 0.85 µm, and a bandwidth greater than 0.75 GHz-Km at 1.3 µm. In some embodiments, the MMF disclosed herein comprises a refractive index profile which provides a bandwidth greater than 2 GHz-Km at 0.85 µm, and a bandwidth greater than 1 GHz-Km for at least one wavelength between 0.98 and 1.66 µm. In some embodiments, the MMF disclosed herein comprises a refractive index profile which provides a bandwidth greater than 4 GHz-Km at 0.85 µm, and a bandwidth greater than 1 GHz-Km for at least one wavelength between 0.98 and 1.66 µm. In these embodiments the core preferably has a graded index profile.

In one set of embodiments, a first window is centered at about 0.85 µm and a second window is centered at a wavelength less than about 1.4 µm. In another set of embodiments, a first window is centered at about 0.85 µm and a second window is centered at a wavelength less than about 1.56 µm.

Additional features and advantages will be set forth in the detailed description which follows, and in part will be readily apparent to those skilled in the art from the description or recognized by practicing the embodiments as described in the written description and claims hereof, as well as the appended drawings It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
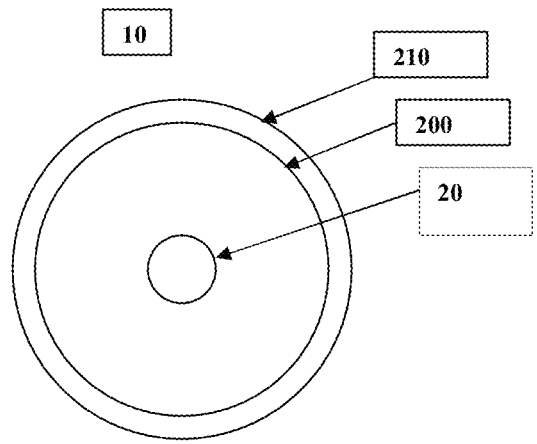
FIG. 1 schematically illustrates a cross-sectional view of one embodiment of the optical fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the refractive index of pure silica. As used herein, the relative refractive index is represented by $\Delta$ (and $\delta$) and its values are given in units of "%", unless otherwise specified. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. One or more other dopants which are not updopants may be present in a region of an optical fiber having a positive relative refractive index. A downdopant may be present in a region of an optical fiber having a positive relative refractive index when accompanied by one or more other dopants which are not downdopants. The terms germania, Ge and $GeO_2$ are used interchangeably herein and refer to $GeO_2$. The terms phosphorus, P and $P_2O_5$ are used interchangeably herein and refer to $P_2O_5$. The terms boron, B and $B_2O_3$ are used interchangeably herein and refer to $B_2O_3$ The optical core diameter is measured using the technique set forth in IEC 60793-1-20, titled "Measurement Methods and Test Procedures—Fiber Geometry", in particular using the reference test method outlined in Annex C thereof titled "Method C: Near-field Light Distribution." To calculate the optical core radius from the results using this method, a 10-80 fit was applied per section C.4.2.2 to obtain the optical core diameter, which is then divided by 2 to obtain the optical core radius.

As used herein, numerical aperture (NA) of the fiber means numerical aperture as measured using the method set forth in TIA SP3-2839-URV2 FOTP-177 IEC-60793-1-43 titled "Measurement Methods and Test Procedures-Numerical Aperture".

Macrobend performance is determined according to FOTP-62 (JEC-60793-1-47) by wrapping 1 turn around a 10 mm diameter mandrel and measuring the increase in attenuation due to the bending using an encircled flux (EF) launch condition (this is also referred to as a restricted launch condition). The encircled flux is measured by launching an overfilled pulse into an input end of a 2 m length of InfiniCor® 50 micron core optical fiber which is deployed with a 1 wrap on a 25 mm diameter mandrel near the midpoint. The output end of the InfiniCor® 50 micron core optical fiber is spliced to the fiber under test, and the measured bend loss is the difference of the attenuation under the prescribed bend condition to the attenuation without the bend. The overfilled bandwidth is measured according to FOTP-204 using an overfilled launch.

According to the following embodiments, the graded index multimode optical fiber includes a core comprising silica doped with germania and at least one co-dopant (c-d); an inner cladding surrounding and in contact with the core; and an outer cladding surrounding and in contact with the inner cladding. The co-dopant (the second core dopant) is selected from at least one of the following materials: $P_2O_5$, F and/or $B_2O_3$. The core extends from a centerline at r=0 to an outermost core radius, $r_1$ and has a dual alpha, $\alpha_1$ and $\alpha$. The germania is disposed in the core with a germania dopant concentration profile, $C_{Ge1}(r)$, and the core has a center germania concentration at the centerline, $C_{Ge1}$, greater than or equal to 0, and an outermost germania concentration $C_{Ge2}$, at $r_1$, wherein $C_{Ge2}$, is greater than or equal to 0. The co-dopant is disposed in the core with a co-dopant concentration profile, $C_{c-d}(r)$, and the core has a center co-dopant concentration at the centerline, $C_{c-d1}$, greater than or equal to 0, and an outermost co-dopant concentration $C_{c-d2}$, at $r_1$, and (i) $C_{c-d2}$ is greater than or equal to 0; (b) $C_{Ge}(r)=C_{Ge1}-(C_{Ge1}-C_{Ge2})(1-x_1)r^{\alpha 1}-(C_{Ge1}-C_{Ge2})x_1 r^{\alpha 2}$; (c) $C_{c-d}(r)=C_{c-d1}-(C_{c-d1}-C_{c-d2})x_2 r^{\alpha 1}-(C_{c-d1}-C_{c-d2})(1-x_2)r^2$; (d) $1.8 < \alpha_1 < 2.4, 1.8 < \alpha_2 3.1$; and wherein $-10 < x_1 < 10$ and $-10 < x_2 < 10$.

According to some embodiments wherein the inner cladding region includes random voids or is comprised of silica doped with boron, fluorine, or co-doping of fluorine and germania.

The voids (also referred as holes herein) can be non-periodically disposed in the depressed-index annular region 50. By "non-periodically disposed" or "non-periodic distribution", we mean that when one takes a cross section (such as a cross section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross sections will have different hole patterns, wherein the distributions of holes and sizes of holes do not match. That is, the voids or holes are non-periodic, i.e., they are not periodically disposed within the fiber structure.

These holes are stretched (elongated) along the length (i.e. parallel to the longitudinal axis) of the optical fiber, but do not extend the entire length of the entire fiber. While not wishing to be bound by theory, it is believed that the holes extend less than a few meters, and in many cases less than 1 meter along the length of the fiber.

In some embodiments a maximum the voids in region 50 have a maximum diameter of 15 microns; in other embodiments, at least 90% of the plurality of non-periodically disposed voids comprises a maximum average hole diameter of 10 microns; in other embodiments, the plurality of non-periodically disposed holes comprises an average void diameter of less than 2000 nm; in other embodiments, the depressed-index annular portion comprises a regional void area percent greater than 0.5 percent; in other embodiments, the depressed-index annular portion comprises a regional void area percent of between 1 and 20 percent; in other embodiments, the depressed-index annular portion comprises a total void area percent greater than 0.05 percent.

As depicted in FIG. 1, the optical fiber 10 of the embodiments disclosed herein comprises a silica based core 20 and a silica based cladding layer (or cladding) 200 surrounding and directly adjacent (i.e. in contact with) the core. Preferably, the fiber has a numerical aperture NA between 0.15 and 0.25 (e.g., 0.185 and 0.215, or 0.185 and 0.23, or 0.195 and 0.25, or 0.195 and 0.225, or between 2 and 2.1). Preferably the fiber bandwidth is greater than 2 GHz-Km, centered on a wavelength within 900 nm and 1300 nm.

The core 20 extends from a centerline at r=0 to an outermost core radius, $R_1$. The cladding 200 extends from the radius, $R_1$ to an outermost core radius, $R_{max}$. In some embodiments the cladding 200 of the optical fiber 10 includes a silica based region 50 surrounding the core and having a refractive index lower than that of silica. The silica based cladding region 50 may comprise, for example, F and optionally $GeO_2$. In some embodiments, this silica based cladding region 50 includes random or non-periodically distributed voids (for example filled with gas). In some embodiments the silica based region 50 extends through the entire cladding 200. In other embodiments an outer cladding layer 60 surrounds the cladding region 50. In some embodiments the cladding 200 of the optical fiber 10 includes a silica based region 50 surrounding the core and having a refractive index lower than that of outer cladding layer 60.

Figure 2A:
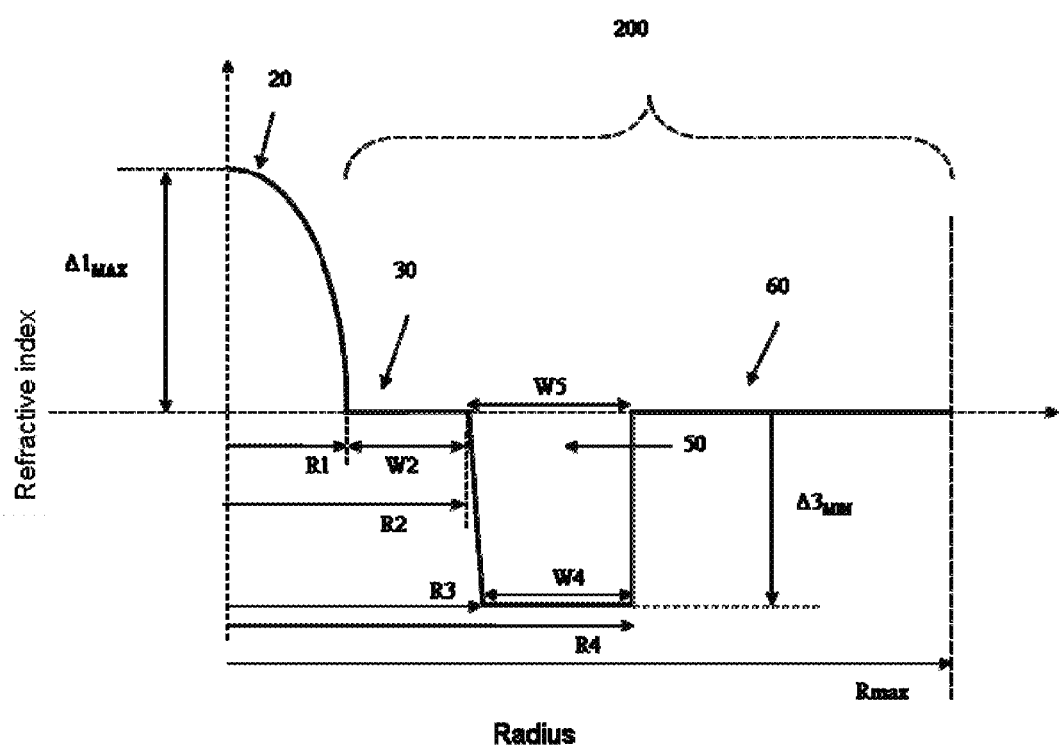
FIG. 2A depicts a schematic refractive index profile of one embodiment of a graded index multimode fiber.
Figure 2B:
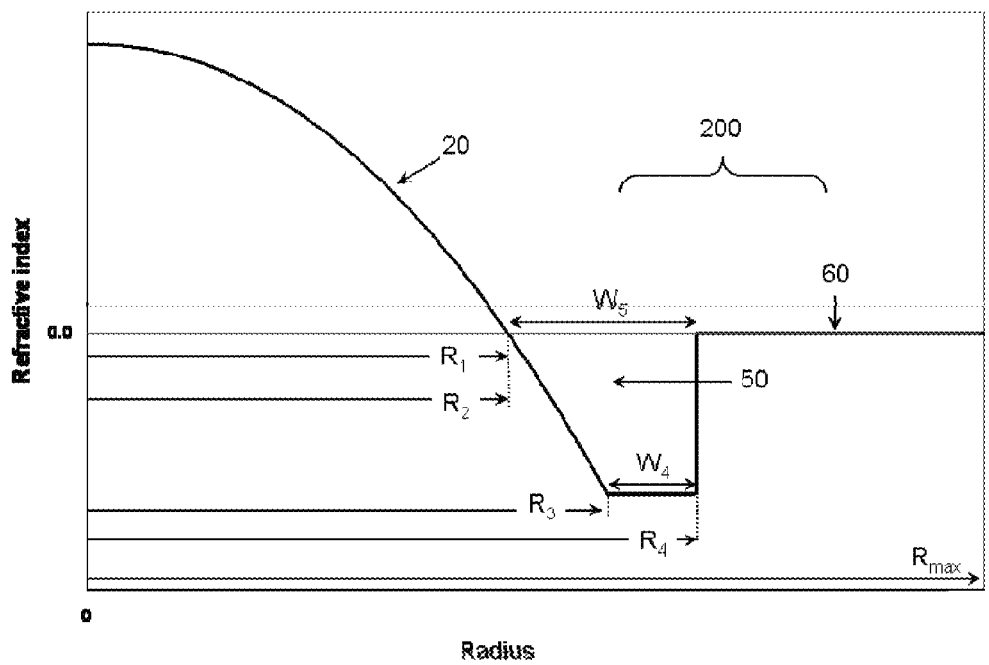
FIG. 2B depicts a schematic refractive index profile of another embodiment of a graded index multimode fiber.

In some embodiments an optional silica based inner cladding layer 30 is situated between the core 20 and the down-doped region 50. In these embodiments the cladding 200 has a relative refractive index profile, $A_{CLAD}(r)$. An exemplary schematic relative refractive index profile of the optical fiber 10 is depicted in FIG. 2A. In some embodiments the down-doped region 50 is offset from the core 20 by a width $W_2=R_2-R_1$, and such that this region begins at $r=R_2$ and ends at $r=R_4$ having a widths of $W_4=R_4-R_3$ and $W_5=R_4-R_2$ (see, for example, FIG. 2A). In other embodiments the down-doped region 50 directly abuts the core 20, and may have a rectangular or a trapezoidal cross sections such that this region begins at $r=R_1$ and ends at $r=R_4$ having a widths $W_4=R_4-R_3$ and $W_5=R_4-R_2$ (see, for example, FIG. 2B, where in this example $R_2=R_1$). The cladding 200 extends from $R_4$ to an outermost cladding radius, $R_{max}$. In some embodiments, the cladding 200 comprises Ge-P co-doped silica (for example, in layers 30, and/or 60). In some embodiments, the cladding 200 comprises fluorine doped silica, for example in layer 50. For example, in some embodiments the silica based region 50 (also referred as a moat herein) is surrounded, by a silica outer cladding (e.g., a pure silica cladding layer 60), or an updoped silica based region 60. This is illustrated, for example, in FIGS. 2A and 2B. The core 20 and the cladding 200 form the glass portion of the optical fiber 10. In some embodiments, the cladding 200 is coated with one or more coatings 210, for example with an acrylate polymer.

In the fiber embodiments with silica doped core doped with two co-dopants the index profile can be described by the following equation(Eq. 1)

$$n_1^2 r - n_0^2 1 - 2_1 r^1 - 2_2 r^2 \qquad \text{Eq. 1}$$

where $\Delta_1$ and $\Delta_2$ are the relative (with respect to pure silica) refractive index changes due to dopants 1 and 2, respectively. For an optimized profile, $\Delta_1$ and $\Delta_2$ satisfy the following conditions (Eq. 2):

$$\alpha_i = 2 - 2\frac{n_0}{m_0}\frac{\lambda}{\Delta_i}\frac{d\Delta_i}{d\lambda} - \frac{12}{5}\Delta \quad i=1,2 \qquad \text{Eq. 2}$$

where $\Delta=\Delta_1+\Delta_2$ and $n_0$ is the index at the center R=0, and $m_0$ is the material dispersion at $n_0$.

We introduce two parameters $x_1$ and $x_2$ to describe the relative index changes in Eq. 3 and Eq. 4 (and Eq. 5-8) such that $$\Delta_1 = \frac{(\delta_{a1} - \delta_{a2})(1-x_1) + (\delta_{b1} - \delta_{b2})x_2}{2n_0^2} \qquad \text{Eq. 3}$$

$$\Delta_2 = \frac{(\delta_{a1} - \delta_{a2})x_1 + (\delta_{b1} - \delta_{b2})(1-x_2)}{2n_0^2} \qquad \text{Eq. 4}$$

where $$\bar{}_{a1} - n_{a1}{}^2 -_s{}^2 \qquad \text{Eq. 5}$$

$$\bar{}_{a2} - n_{a2}{}^2 -_s{}^2 \qquad \text{Eq. 6}$$

$$\bar{}_{b1} - n_{b1}{}^2 -_s{}^2 \qquad \text{Eq. 7}$$

$$\bar{}_{b2} - n_{b2}{}^2 -_s{}^2 \qquad \text{Eq. 8}$$

where $n_{a1}$ and $n_{b1}$ are the refractive indices in the center of the fiber core corresponding to dopants 1 and 2 (i.e., to $GeO_2$ and $P_2O_5$; or to $GeO_2$ and $B_2O_3$, or to $GeO_2$ and F) respectively, $n_{a2}$ and $n_{b2}$ are the refractive indices at the edge of fiber core corresponding to dopants 1 and 2, respectively, $n_s$ is the refractive index of pure silica, and as shown in Eq. 9

$$n_0^2 - n_{a1}{}^2 n_{b1}{}^2 n_s{}^2 \qquad \text{Eq. 9}$$

Using the definitions above, the dopant concentration profiles can be expressed as shown in Eq. 10 and Eq 11.

$$C_a r - C_{a1} - C_{a1} - C_{a2} 1 - x_1 r^{-1} - C_{a1} - C_{a2} x_2 r^{-2} \qquad \text{Eq. 10}$$

$$C_b r - C_b - C_{b1} - C_{b2} x_2 r^{-1} - C_{b1} - C_{b2} 1 - x_2 r^{-2} \qquad \text{Eq. 11}$$

where $C_{a1}$ and $C_{b1}$ are the dopant concentrations in the center of the fiber core corresponding to dopants 1 and 2, respectively, $C_{a2}$ and $C_{b2}$ are the dopant concentrations at the edge of fiber core corresponding to dopants 1 and 2, respectively and where $x_1$ and $x_2$ are parameters for the first and second dopant (e.g., $GeO_2$ and $P_2O_5$) respectively, that are weighting factors that describe the contributions of dual dopants on the dopant concentration radial profile. The values for parameters $x_1$ and $x_2$ are selected such that concentrations of the two dopants are always positive. Dopant concentrations can be expressed in units of mole % or can be converted to weight %.

Figure 2C:
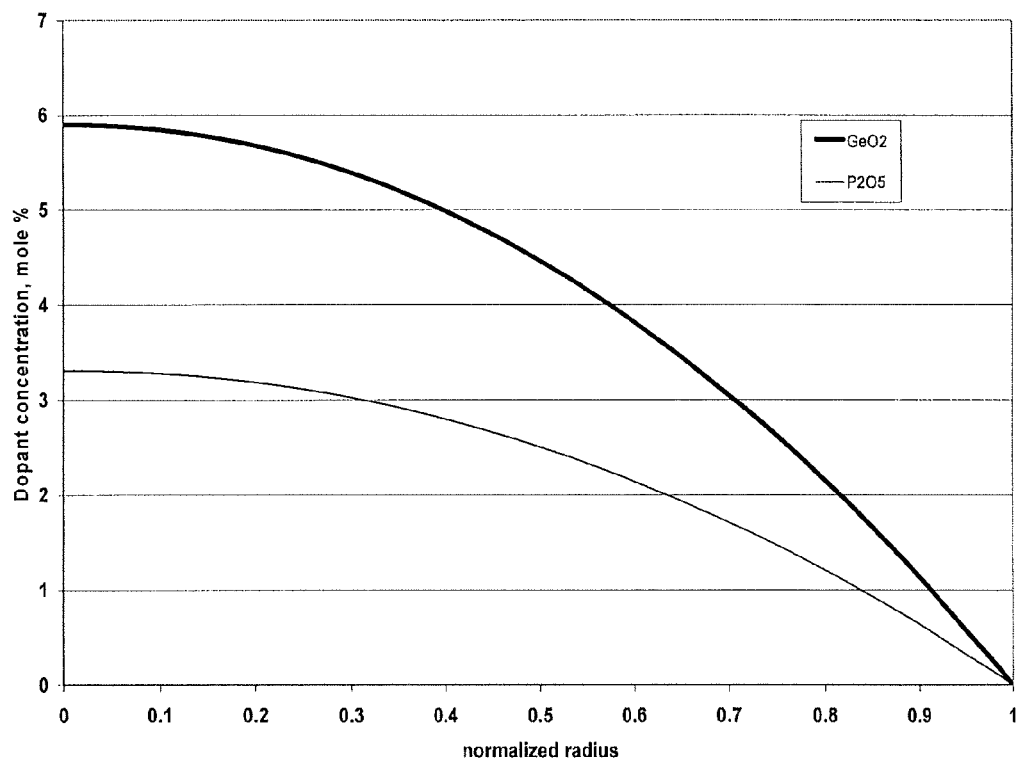
FIG. 2C is a plot of dopant concentration $C_{Ge}$ and $C_P$ vs. normalized core radius, for one exemplary fiber corresponding to FIG. 2A.

More specifically, in the fiber embodiments with Ge-P co-doped cores, germania is disposed in the core 20 of the graded index multimode optical fiber 10 with a germania dopant concentration profile, $C_{Ge}(r)$ (i.e., $C_a(r)=C_{Ge}(r)$) The core 20 has a center germania concentration at the centerline, $C_{a1}=C_{Ge1}$, greater than or equal to 0, and an outermost germania concentration, $C_{G2}$, at $R_1$, wherein $C_{Ge2}$ is greater than or equal to 0. The phosphorus (P) is disposed in the core 20 of the graded index multimode optical fiber 10 with a phosphorus dopant concentration profile, $C_P(r)$—i.e, (i.e., $C_b(r)=C_P(r)$. The graded index core 20 has a center phosphorus concentration at the centerline, $C_{b1}=C_{P1}$, greater than or equal to 0, and may have an outermost phosphorus concentration $C_{P2}$, at $R_1$, wherein $C_{P2}$ is greater than or equal to 0, depending on the profile of phosphorus concentration $C_P(r)$ within the core. One exemplary fiber profile of Ge and P dopant concentrations, $C_{Ge}(r)$ and $C_P(r)$, is shown in FIG. 2C.

The germania dopant concentration profile, $C_{Ge}(r)$, is thus defined by the following Eq. 12:

$$C_{Ge}(r)=C_{Ge1}-(C_{Ge1}-C_{Ge2})(1-x_1)r^{\alpha 1}-(C_{Ge1}-C_{Ge2})x_1 r^{\alpha 2} \quad \text{Eq. 12}$$

The phosphorus dopant concentration profile, $C_P(r)$, is thus defined by the following Eq. 13:

$$C_P(r)=C_{P1}-(C_{P1}-C_{P2})x_2 r^{\alpha 1}-(C_{P1}-C_{P2})(1-x_2)r^{\alpha 2} \quad \text{Eq. 13}$$

Each of the dual dopants, germania and phosphorus, are disposed in the core of the multimode fiber in concentrations which vary with radius and which are defined by two alpha parameters, $\alpha_1$ and $\alpha_2$ of the optical fiber 10 are each about 2. In some embodiments, $1.90<\alpha_1<2.25$ and $1.90<\alpha_2<2.25$. In some embodiments $1.90<\alpha_1<2.10$, and $1.90<\alpha_2<2.10$.

If $n_{Ge1}$ and $n_{P1}$ are the refractive indices in the center of the fiber core corresponding to dopants 1 and 2 (for example, Ge and P), respectively, and $n_{Ge2}$ and $n_{P2}$ are the refractive indices at the edge of fiber core corresponding to dopants 1 and 2 (Ge and P, respectively), $n_s$ is the refractive index of pure silica, and $n_0^2 = n_{G1}^2 + n_{P1}^2 - n_s^2$, then the following parameters can be defined: $\delta_{Ge1}=n_{Ge1}^2-n_s^2$, $\delta_{Ge2}=n_{Ge2}^2-n_s^2$, $\delta_{P1}=n_{P1}^2-n_s^2$, $\delta_{P2}=n_{P2}^2-n_s^2$, and as shown in Eq. 14 and Eq. 15:

$$\Delta_1=[(\delta_{Ge1}-\delta_{Ge2})(1-x_1)+(\delta_{P1}-\delta_{P2})x_2]/2n_0^2 \quad \text{Eq. 14}$$

and $$\Delta_2=[(\delta_{Ge1}-\delta_{Ge2})x_1+(\delta_{P1}-\delta_{P2})(1-2)]/2n_0^2 \quad \text{Eq. 15}$$

and the refractive index profile for an optical fiber core co-doped with Ge and P is shown in Eq. 16:

$$n_1^2(r)=n_0^2(1-2\Delta_1 r^{\alpha 1}-2\Delta_2 r^{\alpha 2}) \quad \text{Eq. 16}$$

The dopant profile parameters, $x_1$ (for Ge) and $x_2$ (for the second codopant), are preferably each between −10 and +10. More preferably $-3<x_1<3$ and $-3<x_2<3$. In some embodiments $-1<x_1<1$ and $-1<x_2<1$, for example, $0.1<x_1<1$ and $0.1<x_2<1$, or $0.3<x_1<0.7$ and $0.3<x_2<0.7$. In some embodiments (e.g., fibers with the Ge–P codoped cores), $0.4<x_1<0.6$ and $0.4<x_2<0.6$. It is noted that in some embodiments $x_1=x_2$, and in some embodiments $x_1$ does not equal $x_2$. The values for parameters $x_1$ and $x_2$ are chosen such that $GeO_2$ and for the second co-dopant concentrations are always positive.

In some embodiments, phosphorus is present at $R_1$ and germania is not, i.e. $C_{P2}$ is greater than 0 and $C_{G2}$ is equal to 0. In these embodiments, the cladding 200 comprises fluorine to match the refractive index of the core at $r=R_1$.

In some embodiments, both germania and phosphorus are present at $R_1$, i.e. $C_{P2}$ is greater than 0 and $C_{Ge2}$ is greater than 0. In these embodiments, the cladding 200 may either comprise fluorine to match the refractive index of the core at $r=R_1$, or the cladding 200 may comprise fluorine and Ge in embodiments with sufficient index-increasing germania at $R_1$ to offset the index decrease due to the fluorine at $R_1$.

Preferably, $C_{Ge}(r)$ decreases with increasing radius from $r=0$ to $r=R_1$, and $C_P(r)$ also decreases with increasing radius from $r=0$ to $r=R_1$. More preferably, $C_{Ge}(r)$ monotonically decreases with increasing radius from $r=0$ to $r=R_1$, and $C_P(r)$ also monotonically decreases with increasing radius from $r=0$ to $r=R_1$. Even more preferably, $C_{Ge}(r)$ decreases with increasing radius from $r=0$ to $r=R_1$, and $C_{P1}$ is nonzero, and $C_P(r)$ also decreases with increasing radius from $r=0$ to $r=R_1$, and $C_{P1}$ is non zero. Still more preferably, $C_{Ge}(r)$ monotonically decreases with increasing radius from $r=0$ to $r=R_1$, and $C_{Ge1}$ is nonzero, and $C_P(r)$ monotonically decreases with increasing radius from $r=0$ to $r=R_1$, and at least one of $C_{Ge2}$ and $C_{P2}=0$. In some embodiments both of $C_{Ge2}$ and $C_{P2}$ are zero.

In one group of embodiments, the germania concentration anywhere in the core 20 is no more than 12 mole % germania, and preferably not more than 11 mole % (i.e., $C_G(r) \leq 11$ mole %), and most preferably not more than 10 mole %. For example, 0.5 mole %$<C_{GeMAX} \leq 11$ mole %, or 1 mole %$<C_{GeMAX}<10$ mole %. In these embodiments the $P_2O_5$ concentration anywhere in the core (for all values of r from $r=0$ to $r=R_1$) is 0 to 12 mole % and the maximum concentration of $P_2O_5$ preferably greater that 0.5 mole. Preferably, the maximum concentration of $P_2O_5$ is less than 10 mole %. Preferably, 1 mole %$<C_{GeMAX} \leq 11$ mole % (e.g., 1 mole %$<C_{GeMAX} \leq 10$ mole % and 1 mole %$<C_{PMAX}<8$ mole %), and/or 1 mole %$<C_{PMAX} \leq 10$ mole %). Preferably, 5 mole %$<(C_{GeMAX}+C_{PMAX}) \leq 19$ mole %, more preferably 5 mole %$<(C_{GeMAX}+C_{PMAX}) \leq 15$ mole %. For example, when $x_1=x_2=0.5$, 8 mole %$<(C_{GeMAX}+C_{PMAX}) \leq 10$ mole %). These parameters enable optical fibers with high bandwidth (e.g., >2 GHz-Km at 850 nm and >1 GHz-Km at 980 and/or 1060 nm, and have NA compatible with VCSEL technology and ITU standards ($0.185 \leq NA \leq 0.215$).

According to some embodiments, maximum $P_2O_5$ concentration anywhere in the core (for all values of r from $r=0$ to $r=R_1$) is 10 to 1 mole %, in some embodiments, preferably 9 to 0 mole %; and the maximum $P_2O_5$ concentration varies from 0.5 to 9 mole %, for example 3 to 9 mole %, or 5 to 9 mole %, or between 6.5 and 8 mole %. In some embodiments, the germania concentration the core 20, in mole %, varies between (for all values of r from $r=0$ to $r=R_1$) 10 and 0 mole %, and in other embodiments, between 6 and 0 mole %, and the maximum Germania concentration is, between 0.5 and 10 mole %, and in still other embodiments, between 1 and 9 mole %. In some embodiments, the $P_2O_5$ concentration in the core 20, in mole %, varies between 9 and 0 and in other embodiments, between 8 and 1, and in other embodiments, between 10 and 0.5 mole %.

More specifically, the core 20 comprises silica that is co-doped, with germania and phosphorus sufficient to provide a graded-index refractive index profile. Each of the dual dopants, germania and phosphorus, are disposed in the core of the multimode fiber in concentrations which vary with radius and which are defined by two alpha parameters, α1 and α2. That is, the germania dopant concentration varies with radius as a function of the alpha parameters, α1 and α2, as does the phosphorus dopant concentration. The dual dopant concentrations disclosed herein also reduce the sensitivity with wavelength of the overall α shape of the refractive index of the optical fiber, which can help increase the productivity yield of such fibers during their manufacture, thereby reducing waste and costs. As used herein, the term graded index refers to a multimode optical fiber with a refractive index having an overall α of about 2.

In some exemplary embodiments the graded index multimode fiber 10 includes: (i) a silica based core 20 co-doped with $GeO_2$, a maximum concentration of $P_2O_5$ about 1 to 10 mole %, and about 200 to 2000 ppm by wt. Cl, and less than 1 mole % of other index modifying dopants; the core 20 having a dual alpha, $\alpha_1$ and $\alpha_2$, where $1.8 \leq \alpha_1 \leq 2.4$ and $1.9 \leq \alpha_2 \leq 2.4$ at least one wavelength in the wavelength range between 840 and 1100 nm (preferably at 850 nm); and (ii) a silica based cladding 200 surrounding the core 20 and comprising F and optionally $GeO_2$ and having at least one region (e.g., 50) with the refractive index lower than that of silica. At least some of these embodiments of fiber 10 have a numerical aperture between 0.185 and 0.215.

In some exemplary embodiments the graded index multimode fiber 10 includes: (i) a silica based core 20 co-doped with $GeO_2$, a maximum concentration of $B_2O_3$ about 1 to 10 mole %, and about 200 to 2000 ppm by wt. Cl, and less than 1 mole % of other index modifying dopants; the core 20 having a dual alpha, $\alpha_1$ and $\alpha_2$, where $1.8 \leq \alpha_1 \leq 2.4$ and $1.9 \leq \alpha_2 \leq 2.4$ at least one wavelength in the wavelength range between 840 and 1100 nm (preferably at 850 nm); and (ii) a silica based cladding 200 surrounding the core 20 and comprising F and optionally $GeO_2$ and having at least one region (e.g., 50) with the refractive index lower than that of silica. At least some of these embodiments of fiber 10 have a numerical aperture between 0.185 and 0.225.

In some exemplary embodiments the graded index multimode fiber 10 includes: (i) a silica based core 20 co-doped with $GeO_2$, a maximum concentration of $B_2O_3$ about 1 to 10 mole %, and about 200 to 2000 ppm by wt. Cl, and less than 1 mole % of other index modifying dopants; the core 20 having a dual alpha, $\alpha_1$ and $\alpha_2$, where $1.8 \leq \alpha_1 \leq 2.4$ and $1.9 \leq \alpha_2 \leq 2.4$ at least one wavelength in the wavelength range between 840 and 1100 nm (preferably at 850 nm); and (ii) a silica based cladding 200 surrounding the core 20 and comprising F and optionally $GeO_2$ and having at least one region (e.g., 50) with the refractive index lower than that of silica, and/or lower than that of cladding region 60. At least some of these embodiments of fiber 10 have a numerical aperture between 0.185 and 0.225

In some exemplary embodiments the graded index multimode fiber 10 includes: (i) a silica based core 20 co-doped with $GeO_2$, a maximum concentration of F about 1 to 10 mole %, and about 200 to 2000 ppm by wt. Cl, and less than 1 mole % of other index modifying dopants; the core 20 having a dual alpha, $\alpha_1$ and $\alpha_2$, where $1.8 \leq \alpha_1 \leq 2.4$ and $1.9 \leq \alpha_2 \leq 2.4$ at least one wavelength in the wavelength range between 840 and 1100 nm (preferably at 850 nm); and (ii) a silica based cladding 200 surrounding the core 20 and comprising F and optionally $GeO_2$ and having at least one region (e.g., 50) with the refractive index lower than that of silica. At least some of these embodiments of fiber 10 have a numerical aperture between 0.185 and 0.215

According to some embodiments the bandwidth (BW) of fiber 10 is greater than 750 MHz-Km, more preferably, greater than 2 GHz-Km, even more preferably greater than 4 GHz-Km, and in some embodiments greater than 7 GHz-Km at about 850 nm. According to some embodiments the bandwidth of fiber 10 is greater than 1500 MHz-Km, more preferably, greater than 2 GHz-Km, even more preferably greater than 4 GHz-Km, and in some embodiments greater than 7 GHz-Km at about 980 nm and/or 1060 nm. According to some embodiments the bandwidth of fiber 10 is greater than 1500 MHz-Km, more preferably greater than 2 GHz-Km, at about 1300 nm. In some embodiments the bandwidth (BW) of fiber 10 is greater than 750 MHz-Km, more preferably greater than 2 GHz-Km, even preferably greater than 4 GHz-Km, and in some embodiments greater than 7 GHz-Km at about 850 nm and the BW is greater than 1500 MHz-Km, more preferred, greater than 2 GHz-Km at 980 nm. In some embodiments the bandwidth (BW) of fiber 10 is greater than 750 MHz-Km, more preferred, greater than 2 GHz-Km, even more preferred greater than 4 GHz-Km, and in some embodiments greater than 7 GHz-Km at about 850 nm and the BW is greater than 1500 MHz-Km, more preferred, greater than 2 GHz-Km at 1060 nm.

Preferably optical fiber 10 has restricted launch bend loss (macrobend loss) at $\lambda=850$ nm is less than 1.5 dB/turn on a 10 mm diameter mandrel, and according to some embodiments the bend loss at $\lambda=850$ nm is less than 0.25 dB/turn on a 10 mm diameter mandrel.

In some embodiments the low index cladding region 50 includes F and Ge, where the volume average Ge concentration in the moat region is at least 0.5 wt %. Preferably the core 20 is separated (off-set) by at least 0.5 μm from the cladding region 50. Alternatively, this cladding region may include random or non-periodically distributed voids (for example filled with gas). Preferably the volume V of cladding region 50 (moat) is greater than 30 square microns-percent ($\mu m^2$-%), and more preferably greater than 100 and less than 300 square microns-percent.

According to some embodiments the graded index multimode fiber 10 comprises: (i) a silica based core 20 co-doped with $GeO_2$ ((preferably the maximum amount of $GeO_2$ in the core is 0.5 to 9 mole %, and more preferably 4-9 mole %) and about 0.5 to 11 mole. % (max amount $P_2O_5$, and less than 1 wt. % of other index modifying dopants; the core having a dual alpha, $\alpha_1$ and $\alpha_2$, where $1.8 \leq \alpha_1 \leq 2.4$ and $1.9 \leq \alpha_2 \leq 2.4$ at least one wavelength in the wavelength range between 840 and 1100 nm, preferably at 850 nm and a core diameter and a physical core diameter, ($D_C = 2R_1$), wherein 45 μm ≤ Dc ≤ 55 μm (and in some embodiments 47 ≤ Dc ≤ 53 μm); and (ii) a silica based region (cladding 200) surrounding the core 20 and comprising F and optionally $GeO_2$.

The silica based cladding region (cladding layer 50) has a refractive index lower than that of silica. The fiber 10 has a numerical aperture between 0.185 and 0.215; a bandwidth greater than 2 GHz-Km, and least one peak wavelength λp situated in a range of 800 nm and 900 nm. According to some embodiments the multimode fiber provides a bandwidth characterized by $\lambda p_1$ situated in a range 800 nm and 900 nm and $\lambda p_2$ situated in a range of 950 to 1080 nm.

According to some embodiments graded index multimode fiber comprises: (i) a silica based core region 20 co-doped with (a) $GeO_2$ and (b) about 1 to 9 mole % $P_2O_5$; and about 200 to 2000 ppm by wt. Cl, and less than 1 wt. % of other index modifying dopants; the core having an alpha between 1.95 and 2.25 (e.g., between 2 and 2.25, or between 2.05 and 2.2) at the wavelength range between 840 nm and 1100 nm; and (ii) a silica based region 50 surrounding the core region comprising F and optionally $GeO_2$ and having a refractive index lower than that of silica, wherein the fiber has a numerical aperture between 0.185 and 0.25.

The graded index multimode fiber 10 preferably has moat volume (i.e., the volume, V, of low refractive index region 50) that is greater than 40 and less than 300 square microns-percent, and a macrobend loss of at 850 nm of less than 0.3 dB/turn on a 10 mm diameter mandrel. According to some embodiments the moat volume, V, is greater than 100 and less than 300 square microns-percent, and the fiber exhibits a macrobend loss at λ=850 nm of less than 0.25 dB/turn on a 10 mm diameter mandrel. Preferably, the fiber 10 has (i) a silica based core region co-doped with 1-10 mole % (max) $GeO_2$ and about 1 to 8 mole % (max) $P_2O_5$, and less than 1 wt. % of other index modifying dopants; the core having a dual alpha, $\alpha_1$ and $\alpha_2$, where $1.8 \leq \alpha_1 \leq 2.4$ and $1.9 \leq \alpha_2 \leq 2.4$ at least one wavelength in the wavelength range between 840 and 1100 nm, preferably at 850 nm and a physical core diameter, Dc, wherein $45 \leq Dc \leq 55$ microns; and has a numerical aperture between 0.185 and 0.215; a bandwidth greater than 2 GHz-Km, and least one peak wavelength λp situated in a range of 800 and 900 nm. In some embodiments the optical fiber 10 is structured to provide a bandwidth characterized by the first peak wavelength $\lambda p_1$ situated in a range 800 nm and 900 nm and a second peak wavelength $\lambda p_2$ situated in a range of 950 nm to 1600 nm. In some embodiments the fiber core 20 further comprises about 200 to 2000 ppm by wt. Cl. Preferably, the fiber core has X mole % (max) of $GeO_2$ and Y mole % (max) of $P_2O_5$; and X>Y. In some embodiments $1 \leq X/Y \leq 8$. In some embodiments the maximum concentration of $GeO_2$ and $P_2O_5$ is at the center of the core 20, or (in the case of a fiber with a core profile that has a centerline dip, in the core region directly adjacent to and surrounding the centerline dip). Preferably, core 20 comprises $GeO_2$ and about 1 to 11 (and more preferably 1 to 9) mole % (max) $P_2O_5$, such that the sum of $GeO_2$ and $P_2O_5$ is not more than 19 mole % and wherein the bandwidth is >750 MHz-Km at about 850 nm. Preferably, the restricted launch bend loss at λ=850 nm is less than 0.25 dB/turn when measured when fiber is bent at diameter of 10 mm.

According to some embodiments the multimode fiber comprises: (i) a silica based core co-doped with $GeO_2$ and about 0.5 to 10 mole % $P_2O_5$ (and preferably 1 to 8 mole %), and less than 1 wt. % of other index modifying dopants; the core having a dual alpha, $\alpha_1$ and $\alpha_2$, where $1.8 \leq \alpha_1 \leq 2.4$ and $1.9 \leq \alpha_2 \leq 2.4$ at least one wavelength in the wavelength range between 840 and 1100 nm, (preferably at 850 nm) and a physical core diameter, Dc where $Dc = 2R_1$ and wherein $25 \leq Dc \leq 55$ microns, and in some embodiments $25 \leq Dc \leq 45$ microns; and (ii) a silica based cladding region that (a) surrounds the core and comprises F and optionally $GeO_2$ and (b) has a refractive index lower than that of silica. The fiber 10 has a numerical aperture between 0.185 and 0.215; a bandwidth greater than 2 GHz-Km at least one wavelength situated in a range of 800 and 900 nm.

All examples shown herein are modeled.

Comparative Examples

Figure 3:
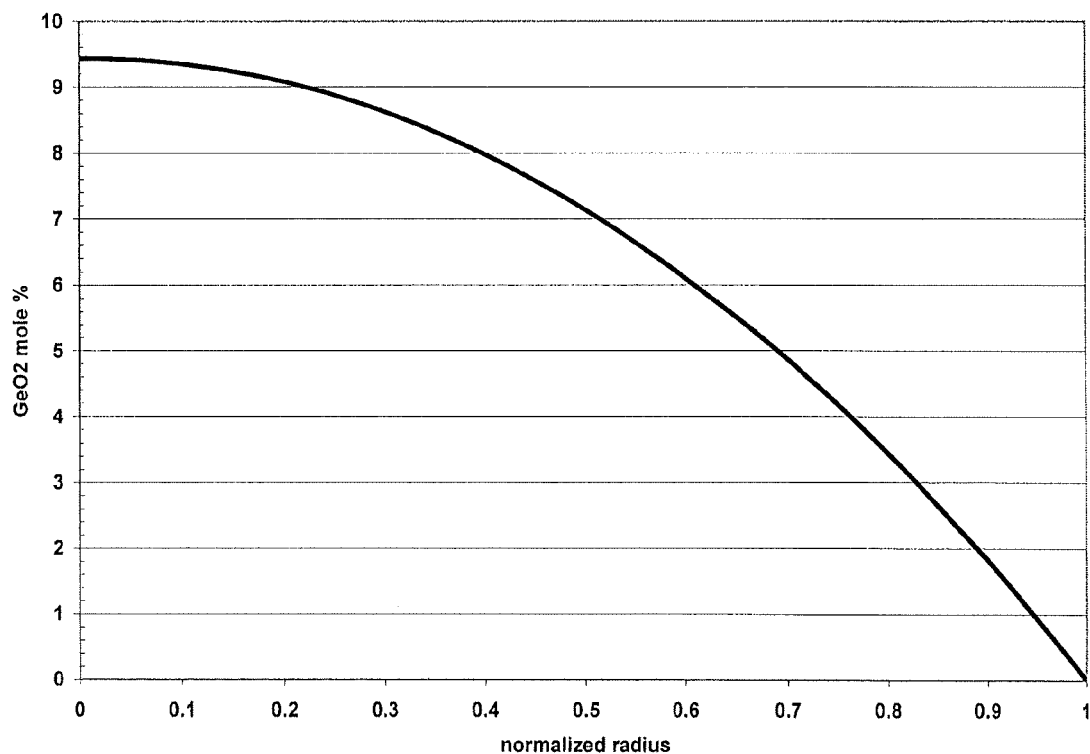
FIG. 3 schematically depicts the Ge dopant concentration profile in the core of a comparative graded index multimode fiber with only germania in the core.
Figure 4:
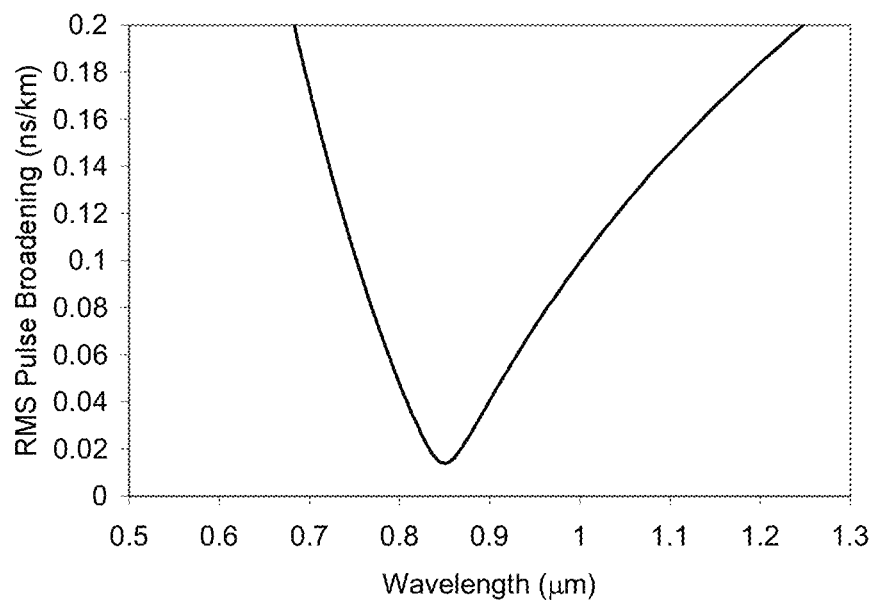
FIG. 4 shows the root mean square (RMS) pulse broadening as a function of wavelength for the fiber of FIG. 3A.

FIG. 3 schematically depicts the germania dopant concentration profile in the core of a comparative multimode fiber with a graded index refractive index profile intended for operation at 0.85 µm. The core of this fiber is doped only with Ge—i.e., it does not include phosphorus or fluorine. FIG. 4 shows the root mean square (RMS) pulse broadening as a function of wavelength for the fiber of FIG. 3. The pulse width reaches a minimum at the wavelength of 0.85 µm. For wavelengths away from 0.85 µm, the pulse width increases very rapidly, i.e. the bandwidth decreases. The RMS pulse broadening is less than 0.02 ns/km for all wavelengths between about 0.84 µm and about 0.86 µm, i.e., over a wavelength window width of about 0.02 µm, and over a wavelength window width of 0.02 µm centered at 0.85 µm. The ratio of RMS pulse broadening at 850 nm to that at 980 nm is about 0.16 and the ratio of RMS pulse broadening at 850 nm to that at 1300 nm is about 0.06. Thus, while the pulse broadening may be very low at one wavelength (e.g., 850 nm) in rapidly rises when operating the same optical fiber is used at a different wavelength (e.g., longer wavelength, such as 980 or 1300 nm). As described herein, RMS pulse broadening is the result of RMS time delay in a multimode fiber.

Tables 1A, 2A, 3A and 4A depict parameters of two comparative fiber examples. The two comparative examples have similar cores, but comparative example 1 has a cladding that does not include a down doped region (i.e., no moat) and the comparative example 2 fiber has a cladding that does includes a down doped region (i.e., it has moat). The cores of theses comparative fiber examples include germania, but do not include phosphorus.

TABLE 1A

| Example | $GeO_2$ Concentration (mole %), $C_{Ge1}$ | $GeO_2$ Concentration (mole %), $C_{Ge2}$ | $x_1$ | 2nd dopant Concentration (core center) (mole %), $C_{sd1}$ | 2nd dopant (core edge) (mole %), $C_{sd2}$ | $x_2$ | Moat (y/n) |
|---|---|---|---|---|---|---|---|
| Comparative Ex. 1 | 9.44 | 0 | 0.5 | 0 | 0 | 0.5 | n |
| Comparative Ex. 2 | 9.44 | 0 | 0.5 | 0 | 0 | 0.5 | y |

TABLE 2A

| | alpha$_1$ | alpha$_2$ | $R_1$, µm | $R_2$, $R_3$, µm | $R_4$, µm | $R_{max}$, µm | Delta-3Min, % |
|---|---|---|---|---|---|---|---|
| Comparative Ex 1 | 2.065 | not applicable | 25 | 25 | 25 | 62.5 | 0 |
| Comparative Ex2 | 2.065 | not applicable | 25 | 26.2 | 29.4 | 62.5 | −0.45 |

As shown in Tables 2A and 3A, the moat value of the comparative example 1 fiber is zero (no moat is present), while the moat value of the comparative example 2 fiber is 80%-µ$^2$.

Both comparative fibers exhibiting a single operating window; this was centered about the peak wavelength, wherein λp is 849 nm and 850 nm for the first and the comparative example, respectively. Table 4A, below provides the RMS pulse broadening and the bandwidths (BW) at various wavelength, for each of the two comparative fiber examples.

TABLE 3A

|  | Wavelength of first window at RMS minimum, nm | Wavelength of second window at RMS minimum, nm | Moat Volume (V), %-μm² | Bend loss at 850 nm, 10 mm diameter mandrel, dB/turn | Numerical Aperture | Optical Core Diameter μm |
|---|---|---|---|---|---|---|
| Comparative Ex. 1 | 849 | not applicable | 0 | 0.82 | 0.200 | 50 |
| Comparative Ex. 2 | 850 | not applicable | 80 | 0.15 | 0.206 | 50.4 |

TABLE 4A

|  | RMS pulse broadening at 850 nm, ns/km | RMS pulse broadening at 980 nm, ns/km | RMS pulse broadening at 1300 nm, ns/km | BW at 850 nm, GHz-km | BW at 980 nm, GHz-km | BW at 1300 nm, GHz-km |
|---|---|---|---|---|---|---|
| Comparative Ex. 1 | 0.0141 | 0.0905 | 0.2205 | 13.2 | 2.1 | 0.8 |
| Comparative Ex. 2 | 0.0141 | 0.0905 | 0.2205 | 13.2 | 2.1 | 0.8 |

First Set of Examplary Embodiments

FIG. 2C schematically depicts the core portion (normalized radius) germania and $P_2O_5$ dopant concentration profiles, shown as "$GeO_2$" and "P", respectively, for a multimode optical fiber exemplary of the fibers disclosed herein. In this exemplary embodiment, $\alpha 1=\alpha 2=2.038$, $C_{Ge1}=5.9$ mole % germania, $C_{P1}=3.31$ mole % phosphorus, $C_{Ge2}=0$, $C_{P2}=0$, $x_1=0.5$, $x_2=0.5$, and $R_1=25$ μm (see example 5 of Tables 1B, 3B).

Figure 5:
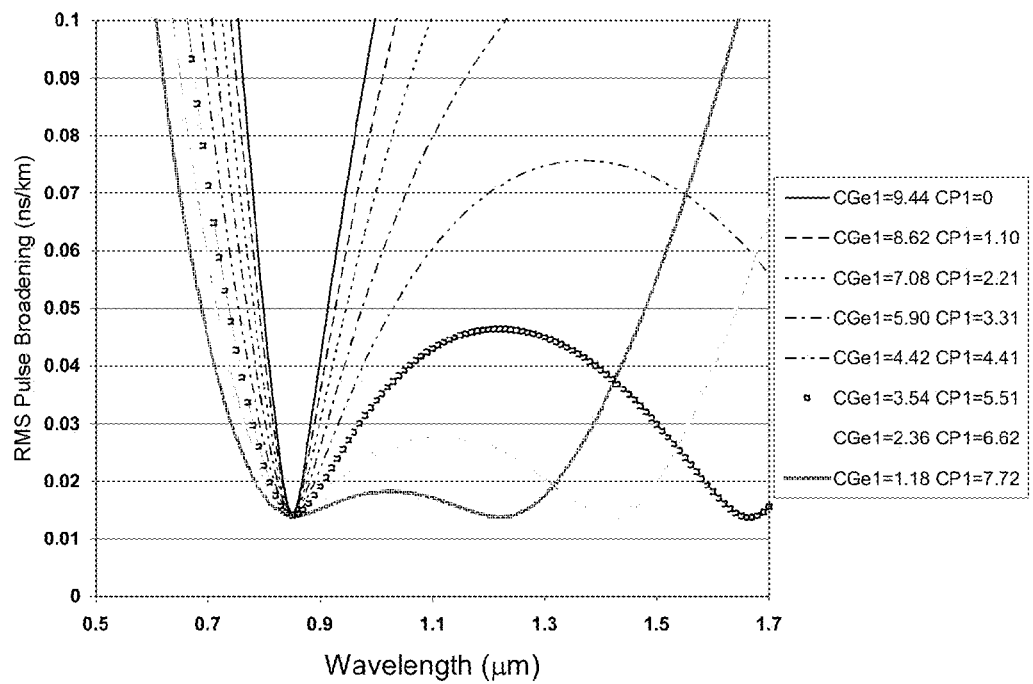
FIG. 5 shows the root mean square (RMS) pulse broadening as a function of wavelength for several exemplary embodiments of Ge and P co-doped fibers.

FIG. 5 schematically illustrates the RMS pulse width of several Ge-P fibers similar to that of FIG. 2A at various wavelengths (see fiber examples 12-20 of Tables 1B and 3B), as well as the RMS pulse broadening (inner most "v" shaped curve) of a comparative fiber with Germania, but no P in the core. As shown in this figure, the RMS pulse broadening is significantly improved for all Ge-P co-doped fibers, within the 0.8 nm to 1.2 nm operating window, relative to that of the comparative example fiber. In addition, this figure indicates that with the larger amount P concentration relative to the Ge concentration at the center of the core 20, the fiber also has a second operating window, which shifts towards shorter central wavelength as the amount of phosphorus at or near the edge of the core ($C_{P2}$) increases. For example, when $C_{Ge1}=1.18$ mole % and $C_{P1}=7.72$ mole % (fiber example 9 of Table 1B, 2B, 3B and 4B), the central wavelength of the second operating window is 1.22 μm, while when $C_{Ge1}=2.36$ mole % and $C_{P1}=6.62$ mole %, the central wavelength of the second operating window is 1.41 μm.

When $C_{Ge1}=1.18$ mole % and $C_{P1}=7.72$ mole %, the RMS pulse broadening is less than 0.02 ns/km for all wavelengths between about 0.75 μm and about 1.3 μm, i.e. over a wavelength window width of about 0.55 μm, and over a wavelength window centered at about 1.05 μm. The bandwidth of this co-doped fiber embodiment is about 13.2 GHz-Km and comparable to a Ge only doped fiber (comparative fiber 1) at 850 nm, however the band width BW of the Ge-P co-doped fiber of this embodiment is about 10.5 and 10.6 GHz-Km at the wavelengths of 980 and 1300 nm, respectively compared to the Ge only doped fiber which has a BW of about 2.1 and 0.8 GHz-Km, respectively. This demonstrates that the co-doped fibers can have about 5-12 times as large as the bandwidth of the fiber of the comparative example fibers a larger wavelength range. The ratio of BW at 850 nm to that at 980 and 1300, respectively, for this co-doped fiber is 1.7 and 1.4, respectively. The ratio of BW at 850 nm to that at 980 and 1300, respectively, for the comparative example, Ge only doped fiber, is 6.4 and 15.7, respectively. Thus showing the Ge-P co-doped fibers 10 have a broader BW window than the comparative fibers with Ge only doped core.

When $C_{Ge1}=2.36$ mole % and $C_{P1}=7.72$ mole % (fiber example 8 of Tables 1B, 2B, 3B and 4B) the RMS pulse broadening is less than 0.03 ns/km for all wavelengths between about 0.75 μm and about 1.65 μm, i.e. over a wavelength window width of about 0.90 μm, while for the comparative example fiber the RMS pulse broadening of less than 0.03 ns/km corresponds only to the wavelength window between about 0.82 μm and about 0.88 μm (window width of about 0.06 or 0.07 μm). For this exemplary embodiment, RMS pulse broadening is less than 0.02 ns/km for all wavelengths between about 0.75 μm and about 0.95 μm, i.e. over a wavelength window width of about 0.2 μm, centered at 0.85 μm. The RMS pulse broadening is also less than 0.02 ns/km for all wavelengths between about 1.3 μm and about 0.5 μm, i.e. over a second wavelength window width of about 0.2 μm. Thus, the optical fiber of this embodiment can operate at two different operating windows, each much broader than that of the comparative fiber. The bandwidth of this co-doped fiber embodiment is about 13.2, 7.9 and 9.3 GHz-Km at 850, 980 and 1300 nm, respectively. The bandwidth for a Ge only doped fiber comparative example is about 13.2, 2.1 GHz-Km and 0.8 at a wavelength of 850 nm, 980 nm and 1300 nm, respectively. Thus, the co-doped fibers can have about 4-11 times as large as the bandwidth of the fiber of the comparative example a larger wavelength range.

Figure 6:
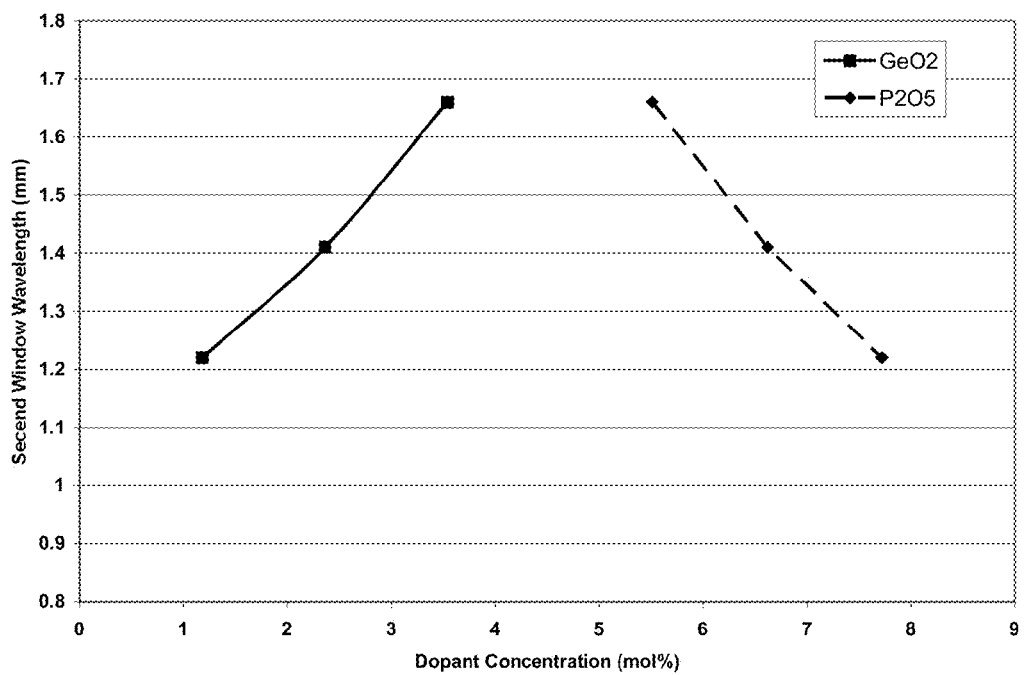
FIG. 6 illustrates the change in the second window center wavelength for some embodiments of Ge and P co-doped fibers.

FIG. 6 illustrates the change in the second window center wavelength vs. maximum P doping level (in these embodiments corresponding to $C_{P1}$) in mole %, for some embodiments of Ge and P co-doped fiber.

Figure 7:
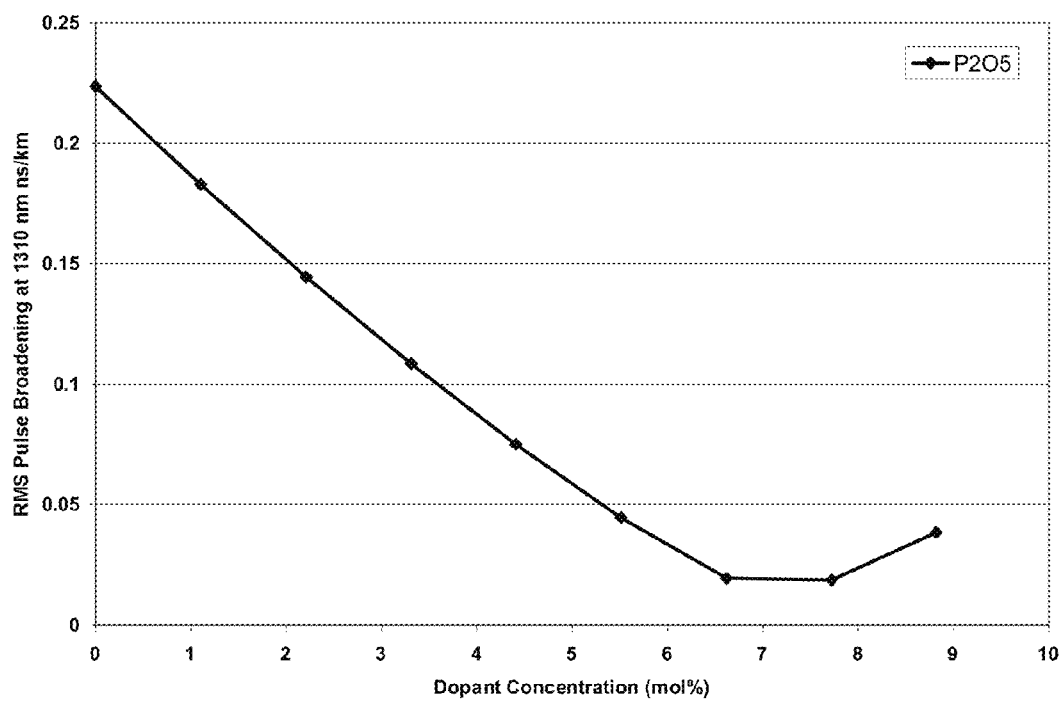
FIG. 7 shows the root mean square (RMS) pulse broadening in ns/km at 1310 nm vs. P doping level in the fiber core for several exemplary embodiments of Ge and P co-doped fibers.

FIG. 7 shows the root mean square (RMS) pulse broadening at 1310 nm ns/km vs. maximum P doping level (mole %), for some embodiments of Ge and P co-doped fiber. In these embodiments $C_P$ max corresponds to $C_{P1}$. This figure illustrates that for these embodiments the preferred maximum P dopant level is between 5 and 9 mole %.

Exemplary Embodiments 1-27

Various additional embodiments of the Ge-P co-doped fibers will be further clarified by the following modeled exemplary embodiments 1-27 (Tables 1B, 2B, 3B and 4B). Fiber embodiments 1-27 have a down-doped region 50 situated in cladding 200. In these exemplary embodiments down doped region 50 (also referred to as a moat herein) is offset from the core 20 by a distance of 1.2 µm (R2−R1=26.2 µm−50 µm=1.2 µm). In these exemplary embodiments some of the fiber parameters are the same—i.e., the relative refractive index of the core (relative to pure silica) is 1%, the outer radius $R_1$ of the core 20 is 25 µm, the outer radius $R_2$ of the inner cladding layer 30 is 26.2 µm, the radius of the outer cladding $R_4$=26.2 µm. In the embodiments 12-38 the minimum refractive index delta of the cladding layer 50 (moat) was −0.45. For these embodiments $x_1$, $x_2$ values are $0.1 \leq x_1 \leq 1$ and $0.1 \leq x_2 \leq 1$.

In fiber embodiments 1-27 of Tables 1B, 2B, 3B and 4B the concentration of germania $C_{Ge1}$ and phosphorus $C_{P1}$ (and the outer radius $R_4$ of the cladding layer 50 in were changed to observe the effect of the changes on fiber performance. The change in the outer radius $R_3$ affected the moat volume of the cladding. The changes in layer 50, which in turn resulted in changes in macrobend performance. Table 3B indicates that the bend performance of the multimode fibers 10 is better for fibers with larger the moat volume V (volume of region 50) which is defined in Eq. 17 as:

$$V = 2\int_{R2}^{R4} \Delta(r) r \, dr \qquad \text{Eq. 17}$$

Accordingly, it is preferable that the moat value be greater than 30 µm²%, more preferably greater 50 µm²%, and even more preferably greater 100 µm²%, for example between 100 and 300 µm²%.

The changes in concentration of germania $C_{Ge1}$ and phosphorus $C_{P1}$ and the diameter of the core ($R_1$) affect the numerical aperture of the fiber, and also the center wavelength of the second operating window as well as the values for RMS pulse broadening and the bandwidth BW at various wavelengths. It is noted that the RMS pulse broadening is much smaller for fiber embodiments 1-27 than that for the comparative examples 1 and 2, and that the bandwidths BW at 980 nm and 1300 nm are also much larger than that of the comparative examples 1 and 2. This is shown in Tables 1B, 2B, 3B and 4B, below.

It is also noted that in other embodiments the relative refractive index of the core is higher or lower than 1%. For example, $\Delta_1$max may be 0.25% 0.3%, 0.5%, 0.7% or 1.1%, 1.5%, 2%, or anything therebetween.

TABLE 1B

| Examplary Embodiment | GeO$_2$ Concentration (mole %), $C_{Ge1}$ | GeO$_2$ Concentration (mole %), $C_{Ge2}$ | $x_1$ | P$_2$O$_5$ Concentration (mole %), $C_{P1}$ | P$_2$O$_5$ Concentration (mole %), $C_{P2}$ | $x_2$ | Moat (y/n) |
|---|---|---|---|---|---|---|---|
| 1  | 8.62 | 0 | 0.5 | 1.1  | 0 | 0.5 | y |
| 2  | 7.08 | 0 | 0.5 | 2.21 | 0 | 0.5 | y |
| 3  | 8.62 | 0 | 0.5 | 1.1  | 0 | 0.5 | y |
| 4  | 7.08 | 0 | 0.5 | 2.21 | 0 | 0.5 | y |
| 5  | 5.9  | 0 | 0.5 | 3.31 | 0 | 0.5 | y |
| 6  | 4.42 | 0 | 0.5 | 4.41 | 0 | 0.5 | y |
| 7  | 3.54 | 0 | 0.5 | 5.51 | 0 | 0.5 | y |
| 8  | 2.36 | 0 | 0.5 | 6.62 | 0 | 0.5 | y |
| 9  | 1.18 | 0 | 0.5 | 7.72 | 0 | 0.5 | y |
| 10 | 8.62 | 0 | 0.5 | 1.1  | 0 | 0.5 | y |
| 11 | 7.08 | 0 | 0.5 | 2.21 | 0 | 0.5 | y |
| 12 | 5.9  | 0 | 0.5 | 3.31 | 0 | 0.5 | y |
| 13 | 4.42 | 0 | 0.5 | 4.41 | 0 | 0.5 | y |
| 14 | 3.54 | 0 | 0.5 | 5.51 | 0 | 0.5 | y |
| 15 | 2.36 | 0 | 0.5 | 6.62 | 0 | 0.5 | y |
| 16 | 1.18 | 0 | 0.5 | 7.72 | 0 | 0.5 | y |
| 17 | 8.62 | 0 | 0.5 | 1.1  | 0 | 0.5 | y |
| 18 | 7.08 | 0 | 0.5 | 2.21 | 0 | 0.5 | y |
| 19 | 5.9  | 0 | 0.5 | 3.31 | 0 | 0.5 | y |
| 20 | 4.42 | 0 | 0.5 | 4.41 | 0 | 0.5 | y |
| 21 | 3.54 | 0 | 0.5 | 5.51 | 0 | 0.5 | y |
| 22 | 2.36 | 0 | 0.5 | 6.62 | 0 | 0.5 | y |
| 23 | 1.18 | 0 | 0.5 | 7.72 | 0 | 0.5 | y |
| 24 | 3.54 | 0 | 0.5 | 5.51 | 0 | 0.5 | y |
| 25 | 3.54 | 0 | 0.1 | 5.51 | 0 | 1.0 | y |
| 26 | 1.80 | 0 | 0.1 | 7.40 | 0 | 1.0 | y |
| 27 | 2.72 | 0 | 0.1 | 6.30 | 0 | 1.0 | y |

TABLE 2B

| Examplary Embodiment | alpha$_1$ | alpha$_2$ | $R_1$, µm | $R_2$, $R_3$, µm | $R_4$, µm | $R_{max}$, µm | Delta-3Min, % |
|---|---|---|---|---|---|---|---|
| 1  | 2.055 | 2.055 | 25 | 26.2 | 28.2 | 62.5 | −0.45 |
| 2  | 2.046 | 2.046 | 25 | 26.2 | 28.2 | 62.5 | −0.45 |
| 3  | 2.055 | 2.055 | 25 | 26.2 | 29.4 | 62.5 | −0.45 |
| 4  | 2.046 | 2.046 | 25 | 26.2 | 29.4 | 62.5 | −0.45 |
| 5  | 2.038 | 2.038 | 25 | 26.2 | 29.4 | 62.5 | −0.45 |
| 6  | 2.310 | 2.310 | 25 | 26.2 | 29.4 | 62.5 | −0.45 |
| 7  | 2.026 | 2.026 | 25 | 26.2 | 29.4 | 62.5 | −0.45 |
| 8  | 2.021 | 2.021 | 25 | 26.2 | 29.4 | 62.5 | −0.45 |
| 9  | 2.018 | 2.018 | 25 | 26.2 | 29.4 | 62.5 | −0.45 |
| 10 | 2.055 | 2.055 | 25 | 26.2 | 31.6 | 62.5 | −0.45 |
| 11 | 2.046 | 2.046 | 25 | 26.2 | 31.6 | 62.5 | −0.45 |
| 12 | 2.038 | 2.038 | 25 | 26.2 | 31.6 | 62.5 | −0.45 |
| 13 | 2.310 | 2.310 | 25 | 26.2 | 31.6 | 62.5 | −0.45 |
| 14 | 2.026 | 2.026 | 25 | 26.2 | 31.6 | 62.5 | −0.45 |
| 15 | 2.021 | 2.021 | 25 | 26.2 | 31.6 | 62.5 | −0.45 |

TABLE 2B-continued

| Examplary Embodiment | $alpha_1$ | $alpha_2$ | $R_1$, μm | $R_2, R_3$, μm | $R_4$, μm | $R_{max}$, μm | Delta-3Min, % |
|---|---|---|---|---|---|---|---|
| 16 | 2.018 | 2.018 | 25 | 26.2 | 31.6 | 62.5 | −0.45 |
| 17 | 2.055 | 2.055 | 25 | 26.2 | 33.6 | 62.5 | −0.45 |
| 18 | 2.046 | 2.046 | 25 | 26.2 | 33.6 | 62.5 | −0.45 |
| 19 | 2.038 | 2.038 | 25 | 26.2 | 33.6 | 62.5 | −0.45 |
| 20 | 2.310 | 2.310 | 25 | 26.2 | 33.6 | 62.5 | −0.45 |
| 21 | 2.026 | 2.026 | 25 | 26.2 | 33.6 | 62.5 | −0.45 |
| 22 | 2.021 | 2.021 | 25 | 26.2 | 33.6 | 62.5 | −0.45 |
| 23 | 2.018 | 2.018 | 25 | 26.2 | 33.6 | 62.5 | −0.45 |
| 24 | 2.036 | 2.213 | 25 | 26.2 | 29.4 | 62.5 | −0.45 |
| 25 | 2.025 | 2.046 | 25 | 26.2 | 29.4 | 62.5 | −0.45 |
| 26 | 2.018 | 2.040 | 25 | 26.2 | 29.4 | 62.5 | −0.45 |
| 27 | 2.022 | 2.043 | 25 | 26.2 | 29.4 | 62.5 | −0.45 |

TABLE 3B

| Examplary Embodiment | Wavelength of first window at RMS minimum, nm | Wavelength of second window at RMS minimum, nm | Moat Volume (V), %-μm² | Bend loss at 850 nm, 10 mm diameter mandrel, dB/turn | Numerical Aperture | Optical Core Diameter μm |
|---|---|---|---|---|---|---|
| 1 | 850 | >1700 | 50 | 0.29 | 0.201 | 51.5 |
| 2 | 850 | >1700 | 50 | 0.29 | 0.201 | 51.5 |
| 3 | 850 | >1700 | 80 | 0.15 | 0.206 | 50.4 |
| 4 | 850 | >1700 | 80 | 0.15 | 0.206 | 50.4 |
| 5 | 850 | >1700 | 80 | 0.15 | 0.206 | 50.4 |
| 6 | 850 | >1700 | 80 | 0.15 | 0.206 | 50.4 |
| 7 | 850 | 1660 | 80 | 0.15 | 0.206 | 50.4 |
| 8 | 850 | 1410 | 80 | 0.15 | 0.206 | 50.4 |
| 8 | 850 | 1220 | 80 | 0.15 | 0.206 | 50.4 |
| 10 | 850 | >1700 | 140 | 0.04 | 0.215 | 48.2 |
| 11 | 850 | >1700 | 140 | 0.04 | 0.215 | 48.2 |
| 12 | 850 | >1700 | 140 | 0.04 | 0.215 | 48.2 |
| 13 | 850 | >1700 | 140 | 0.04 | 0.215 | 48.2 |
| 14 | 850 | 1660 | 140 | 0.04 | 0.215 | 48.2 |
| 15 | 850 | 1410 | 140 | 0.04 | 0.215 | 48.2 |
| 16 | 850 | 1220 | 140 | 0.04 | 0.215 | 48.2 |
| 17 | 850 | >1700 | 200 | 0.01 | 0.223 | 45.9 |
| 18 | 850 | >1700 | 200 | 0.01 | 0.223 | 45.9 |
| 19 | 850 | >1700 | 200 | 0.01 | 0.223 | 45.9 |
| 20 | 850 | >1700 | 200 | 0.01 | 0.223 | 45.9 |
| 21 | 850 | 1660 | 200 | 0.01 | 0.223 | 45.9 |
| 22 | 850 | 1410 | 200 | 0.01 | 0.223 | 45.9 |
| 23 | 850 | 1220 | 200 | 0.01 | 0.223 | 45.9 |
| 24 | 850 | 1660 | 80 | 0.15 | 0.206 | 50.4 |
| 25 | 850 | 1660 | 80 | 0.15 | 0.206 | 50.4 |
| 26 | 850 | 1410 | 80 | 0.15 | 0.206 | 50.4 |
| 27 | 850 | 1220 | 80 | 0.15 | 0.206 | 50.4 |

TABLE 4B

| Exemplary Embodiment | RMS pulse broadening at 980 nm, ns/km | RMS pulse broadening at 1300 nm, ns/km | BW at 850 nm, GHz-km | BW at 980 nm, GHz-km | BW at 1300 nm, GHz-km |
|---|---|---|---|---|---|
| 1 | 0.0764 | 0.1805 | 13.2 | 2.4 | 1.0 |
| 2 | 0.0634 | 0.1428 | 13.2 | 2.9 | 1.3 |
| 3 | 0.0764 | 0.1805 | 13.2 | 2.4 | 1.0 |
| 4 | 0.0634 | 0.1428 | 13.2 | 2.9 | 1.3 |
| 5 | 0.0515 | 0.1075 | 13.2 | 3.6 | 1.7 |
| 6 | 0.0408 | 0.0748 | 13.2 | 4.6 | 2.5 |
| 7 | 0.0314 | 0.0450 | 13.2 | 5.9 | 4.1 |
| 8 | 0.0236 | 0.0201 | 13.2 | 7.9 | 9.3 |
| 8 | 0.0178 | 0.0176 | 13.2 | 10.5 | 10.6 |
| 10 | 0.0764 | 0.1805 | 13.2 | 2.4 | 1.0 |
| 11 | 0.0634 | 0.1428 | 13.2 | 2.9 | 1.3 |
| 12 | 0.0515 | 0.1075 | 13.2 | 3.6 | 1.7 |
| 13 | 0.0408 | 0.0748 | 13.2 | 4.6 | 2.5 |
| 14 | 0.0314 | 0.0450 | 13.2 | 5.9 | 4.1 |
| 15 | 0.0236 | 0.0201 | 13.2 | 7.9 | 9.3 |
| 16 | 0.0178 | 0.0176 | 13.2 | 10.5 | 10.6 |
| 17 | 0.0764 | 0.1805 | 13.2 | 2.4 | 1.0 |
| 18 | 0.0634 | 0.1428 | 13.2 | 2.9 | 1.3 |
| 19 | 0.0515 | 0.1075 | 13.2 | 3.6 | 1.7 |
| 20 | 0.0408 | 0.0748 | 13.2 | 4.6 | 2.5 |
| 21 | 0.0314 | 0.0450 | 13.2 | 5.9 | 4.1 |
| 22 | 0.0236 | 0.0201 | 13.2 | 7.9 | 9.3 |
| 23 | 0.0178 | 0.0176 | 13.2 | 10.5 | 10.6 |
| 24 | 0.0314 | 0.0450 | 13.2 | 5.9 | 4.1 |
| 25 | 0.0314 | 0.0450 | 13.2 | 5.9 | 4.1 |
| 26 | 0.0213 | 0.0147 | 13.2 | 8.8 | 12.7 |
| 27 | 0.0209 | 0.0162 | 13.2 | 8.9 | 11.5 |

The moat 50, or the entire cladding 200 (if no moat layer is present) can comprise of silica doped with fluorine, or alternatively, can be constructed by co-doping germania and F, or phosphorus and F, such that effective index of the co-doped region is $\Delta_{3Min}$. Preferably, $-0.2 < \Delta_{3Min} < -0.7$, for example $-0.3 < \Delta_{3Min} < -0.5$. The Ge-F or P-F co-doping better match the viscosity of the core 20 and the cladding 200. The amount of germania and fluorine or P and F in the cladding is established based on the amount of germania and phosphorus in the core and their influence on the core viscosity.

Second Set of Examplary Embodiments

Various additional embodiments of the Ge-B co-doped fibers will be further clarified by the following modeled exemplary embodiments 28-51 (Tables 1C, 2C, 3C and 4C).

More specifically, in the fiber embodiments with Ge-B co-doped cores, germania is disposed in the core 20 of the graded index multimode optical fiber 10 with a germania dopant concentration profile, $C_{Ge}(r)$ (i.e., $C_a(r)=C_{Ge}(r)$). The core 20 has a center germania concentration at the centerline, $C_{a1}=C_{Ge1}$, greater than or equal to 0, and an outermost germania concentration, $C_{G2}$, at $R_1$, wherein $C_{Ge2}$ is greater than or equal to 0. The boron ($B_2O_3$) is disposed in the core 20 of the graded index multimode optical fiber 10 with a boron dopant concentration profile, $C_B(r)$—i.e., (i.e., $C_{c-d}(r)=C_B(r)$). The graded index core 20 has a center boron concentration at the centerline, $C_{c-d1}=C_{B1}$, greater than or equal to 0, and may have an outermost boron concentration $C_{B2}$, at $R_1$, wherein $C_{B2}$ is greater than or equal to 0, depending on the profile of boron concentration $C_B(r)$ within the core. In some embodiments, germania is present at the centerline and boron is not, i.e. $C_{G1}$ is greater than 0 and $C_{B1}$ is equal to 0. In some embodiments, boron is present at $R_1$ and germania is not, i.e. $C_{B2}$ is greater than 0 and $C_{G2}$ is equal to 0.

Preferably, $C_{Ge}(r)$ decreases with increasing radius from $r=0$ to $r=R_1$, and $C_B(r)$ increases with increasing radius from $r=0$ to $r=R_1$. More preferably, $C_{Ge}(r)$ monotonically decreases with increasing radius from $r=0$ to $r=R_1$, and $C_B(r)$ monotonically increases with increasing radius from $r=0$ to $r=R_1$. Still more preferably, $C_{Ge}(r)$ monotonically decreases with increasing radius from $r=0$ to $r=R_1$, and $C_{Ge1}$ is nonzero, and $C_B(r)$ monotonically increases with increasing radius from $r=0$ to $r=R_1$, and at least one of $C_{B2}$ is non zero.

Fiber embodiments 28-51 have a down-doped region 50 situated in cladding 200. Region 50 surrounds the core and has a refractive index lower than that of outer cladding layer 60.

In these exemplary embodiments some of the fiber parameters are the same, i.e., the relative refractive index of the core (relative to pure silica) is 1%, the outer radius $R_1$ of the core 20 is 25 µm, the outer radius $R_2$ of the inner cladding layer 30 is 26.2 µm, the radius of the outer cladding $R_4$=26.2 µm. In the embodiments 12-38 the minimum refractive index delta of the cladding layer 50 (moat) was −0.45. For these embodiments $x_1$, $x_2$ values are $0.1 \le x_1 \le 1$ and $0.1 \le x_2 \le 1$.

In fiber embodiments 1-27 of Tables 1C, 2C, 3C and 4C the concentration of germania $C_{Ge1}$ and boron $C_{B1}$ in the core, (and the outer radius $R_4$ of the cladding layer 50) were changed to observe the effect of the changes on fiber performance. The change in the outer radius $R_3$ affected the moat volume of the cladding. The changes in layer 50 (in the moat), in turn resulted in changes in macrobend performance. It is noted that in these embodiments the moat is off-set or separated from the core. Table 3C indicates that the bend performance of the multimode fibers 10 is better for fibers with larger the moat volume V (volume of region 50) which is defined in Eq. 17.

Accordingly, it is preferable that the moat value be greater than 30 µm²%, more preferably greater 50 µm²%, and even more preferably greater 100 µm²%, for example between 100 and 300 µm²%.

The changes in concentration of germania $C_{Ge1}$ and boron ($B_2O_3$), $C_{B1}$ and the diameter of the core ($R_1$) affect the numerical aperture of the fiber, and also the center wavelength of the second operating window as well as the values for RMS pulse broadening and the bandwidth BW at various wavelengths. It is noted that the RMS pulse broadening is much smaller for fiber embodiments 28-51 than that for the comparative examples 1 and 2, and that the bandwidths BW at 980 nm and 1300 nm are also much larger than that of the comparative examples 1 and 2. This is shown in Tables 1C, 2C, 3C and 4C, below.

It is also noted that in other embodiments the relative refractive index of the core is higher or lower than 1%. For example, $\Delta_1$max may be 0.25% 0.3%, 0.5%, 0.7% or 1.1%, 1.5%, 2%, or anything therebetween.

TABLE 1C

| Examplary Embodiment | GeO$_2$ Concentration (mole %), $C_{Ge1}$ | GeO$_2$ Concentration (mole %), $C_{Ge2}$ | $x_1$ | B$_2$O$_3$ Concentration (mole %), $C_{B1}$ | B$_2$O$_3$ Concentration (mole %), $C_{B2}$ | $x_2$ | Moat (y/n) |
|---|---|---|---|---|---|---|---|
| 28 | 8.69 | 0 | 0.5 | 0 | 2.0 | 0.5 | y |
| 29 | 7.15 | 0 | 0.5 | 0 | 8.0 | 0.5 | y |
| 30 | 8.07 | 0 | 0.5 | 0 | 4.0 | 0.5 | y |
| 31 | 7.80 | 0 | 0.5 | 0 | 5.0 | 0.5 | y |
| 32 | 7.55 | 0 | 0.5 | 0 | 6.0 | 0.5 | y |
| 33 | 7.55 | 0 | 10 | 0 | 6.0 | 0.5 | y |
| 34 | 8.69 | 0 | 0.5 | 0 | 2.0 | 0.5 | y |
| 35 | 7.15 | 0 | 0.5 | 0 | 8.0 | 0.5 | y |
| 36 | 8.07 | 0 | 0.5 | 0 | 4.0 | 0.5 | y |
| 37 | 7.80 | 0 | 0.5 | 0 | 5.0 | 0.5 | y |
| 38 | 7.55 | 0 | 0.5 | 0 | 6.0 | 0.5 | y |
| 39 | 7.55 | 0 | 10 | 0 | 6.0 | 0.5 | y |
| 40 | 8.69 | 0 | 0.5 | 0 | 2.0 | 0.5 | y |
| 41 | 7.15 | 0 | 0.5 | 0 | 8.0 | 0.5 | y |
| 42 | 8.07 | 0 | 0.5 | 0 | 4.0 | 0.5 | y |
| 43 | 7.80 | 0 | 0.5 | 0 | 5.0 | 0.5 | y |
| 44 | 7.55 | 0 | 0.5 | 0 | 6.0 | 0.5 | y |
| 45 | 7.55 | 0 | 10 | 0 | 6.0 | 0.5 | y |
| 46 | 8.69 | 0 | 0.5 | 0 | 2.0 | 0.5 | y |
| 47 | 7.15 | 0 | 0.5 | 0 | 8.0 | 0.5 | y |
| 48 | 8.07 | 0 | 0.5 | 0 | 4.0 | 0.5 | y |
| 49 | 7.80 | 0 | 0.5 | 0 | 5.0 | 0.5 | y |
| 50 | 7.55 | 0 | 0.5 | 0 | 6.0 | 0.5 | y |
| 51 | 7.55 | 0 | 10 | 0 | 6.0 | 0.5 | y |
| 52 | 8.69 | 0 | 0.5 | 0 | 2.0 | 0.5 | y |

TABLE 1C-continued

| Examplary Embodiment | GeO$_2$ Concentration (mole %), C$_{Ge1}$ | GeO$_2$ Concentration (mole %), C$_{Ge2}$ | x$_1$ | B$_2$O$_3$ Concentration (mole %), C$_{B1}$ | B$_2$O$_3$ Concentration (mole %), C$_{B2}$ | x$_2$ | Moat (y/n) |
|---|---|---|---|---|---|---|---|
| 53 | 7.15 | 0 | 0.5 | 0 | 8.0 | 0.5 | y |
| 54 | 8.07 | 0 | 0.5 | 0 | 4.0 | 0.5 | y |
| 55 | 7.80 | 0 | 0.5 | 0 | 5.0 | 0.5 | y |
| 56 | 7.55 | 0 | 0.5 | 0 | 6.0 | 0.5 | y |
| 57 | 7.55 | 0 | 10 | 0 | 6.0 | 0.5 | y |

TABLE 2C

| Exemplary Embodiment | alpha$_1$ | alpha$_2$ | R$_1$, μm | R$_2$, R$_3$, μm | R$_4$, μm | R$_{max}$, μm | Delta-3Min, % |
|---|---|---|---|---|---|---|---|
| 28 | 1.996 | 1.996 | 25 | 26.2 | 28.2 | 62.5 | −0.45 |
| 29 | 1.879 | 1.879 | 25 | 26.2 | 28.2 | 62.5 | −0.45 |
| 30 | 1.941 | 1.941 | 25 | 26.2 | 28.2 | 62.5 | −0.45 |
| 31 | 1.919 | 1.919 | 25 | 26.2 | 28.2 | 62.5 | −0.45 |
| 32 | 1.901 | 1.901 | 25 | 26.2 | 28.2 | 62.5 | −0.45 |
| 33 | 2.070 | 2.049 | 25 | 26.2 | 28.2 | 62.5 | −0.45 |
| 34 | 1.996 | 1.996 | 25 | 26.2 | 29.4 | 62.5 | −0.45 |
| 35 | 1.879 | 1.879 | 25 | 26.2 | 29.4 | 62.5 | −0.45 |
| 36 | 1.941 | 1.941 | 25 | 26.2 | 29.4 | 62.5 | −0.45 |
| 37 | 1.919 | 1.919 | 25 | 26.2 | 29.4 | 62.5 | −0.45 |
| 38 | 1.901 | 1.901 | 25 | 26.2 | 29.4 | 62.5 | −0.45 |
| 39 | 2.070 | 2.049 | 25 | 26.2 | 29.4 | 62.5 | −0.45 |
| 40 | 1.996 | 1.996 | 25 | 26.2 | 31.6 | 62.5 | −0.45 |
| 41 | 1.879 | 1.879 | 25 | 26.2 | 31.6 | 62.5 | −0.45 |
| 42 | 1.941 | 1.941 | 25 | 26.2 | 31.6 | 62.5 | −0.45 |
| 43 | 1.919 | 1.919 | 25 | 26.2 | 31.6 | 62.5 | −0.45 |
| 44 | 1.901 | 1.901 | 25 | 26.2 | 31.6 | 62.5 | −0.45 |
| 45 | 2.070 | 2.049 | 25 | 26.2 | 31.6 | 62.5 | −0.45 |
| 46 | 1.996 | 1.996 | 25 | 26.2 | 33.6 | 62.5 | −0.45 |
| 47 | 1.879 | 1.879 | 25 | 26.2 | 33.6 | 62.5 | −0.45 |
| 48 | 1.941 | 1.941 | 25 | 26.2 | 33.6 | 62.5 | −0.45 |
| 49 | 1.919 | 1.919 | 25 | 26.2 | 33.6 | 62.5 | −0.45 |
| 50 | 1.901 | 1.901 | 25 | 26.2 | 33.6 | 62.5 | −0.45 |
| 51 | 2.070 | 2.049 | 25 | 26.2 | 33.6 | 62.5 | −0.45 |

Note, in these embodiments R$_2$ = R$_3$

TABLE 3C

| Examplary Embodiment | Wavelength of first window at RMS minimum, nm | Wavelength of second window at RMS minimum, nm | Moat Volume (V), %-μm$^2$ | Bend loss at 850 nm, 10 mm diameter mandrel, dB/turn | Numerical Aperture | Optical Core Diameter μm |
|---|---|---|---|---|---|---|
| 28 | 850 | 850 | 50 | 0.29 | 0.201 | 51.5 |
| 29 | 850 | 870 | 50 | 0.29 | 0.201 | 51.5 |
| 30 | 850 | 850 | 50 | 0.29 | 0.201 | 51.5 |
| 31 | 850 | 870 | 50 | 0.29 | 0.201 | 51.5 |
| 32 | 850 | 870 | 50 | 0.29 | 0.201 | 51.5 |
| 33 | 850 | 880 | 50 | 0.29 | 0.201 | 51.5 |
| 34 | 850 | 850 | 80 | 0.15 | 0.206 | 50.4 |
| 35 | 850 | 870 | 80 | 0.15 | 0.206 | 50.4 |
| 36 | 850 | 850 | 80 | 0.15 | 0.206 | 50.4 |
| 37 | 850 | 870 | 80 | 0.15 | 0.206 | 50.4 |
| 38 | 850 | 870 | 80 | 0.15 | 0.206 | 50.4 |
| 39 | 850 | 880 | 80 | 0.15 | 0.206 | 50.4 |
| 40 | 850 | 850 | 140 | 0.04 | 0.215 | 48.2 |
| 41 | 850 | 870 | 140 | 0.04 | 0.215 | 48.2 |
| 42 | 850 | 850 | 140 | 0.04 | 0.215 | 48.2 |
| 43 | 850 | 870 | 140 | 0.04 | 0.215 | 48.2 |
| 44 | 850 | 870 | 140 | 0.04 | 0.215 | 48.2 |
| 45 | 850 | 880 | 140 | 0.04 | 0.215 | 48.2 |
| 46 | 850 | 850 | 200 | 0.01 | 0.223 | 45.9 |
| 47 | 850 | 870 | 200 | 0.01 | 0.223 | 45.9 |
| 48 | 850 | 850 | 200 | 0.01 | 0.223 | 45.9 |
| 49 | 850 | 870 | 200 | 0.01 | 0.223 | 45.9 |
| 50 | 850 | 870 | 200 | 0.01 | 0.223 | 45.9 |
| 51 | 850 | 880 | 200 | 0.01 | 0.223 | 45.9 |

TABLE 4C

| Examplary Embodiment | RMS pulse broadening at 850 nm, ns/km | RMS pulse broadening at 980 nm, ns/km | RMS pulse broadening at 1300 nm, ns/km | BW at 850 nm, GHz-km | BW at 980 nm, GHz-km | BW at 1300 nm, GHz-km |
|---|---|---|---|---|---|---|
| 28 | 0.0141 | 0.0495 | 0.1386 | 13.2 | 3.8 | 1.3 |
| 29 | 0.0140 | 0.0279 | 0.1678 | 13.3 | 6.7 | 1.1 |
| 30 | 0.0141 | 0.0247 | 0.0973 | 13.3 | 7.6 | 1.9 |

TABLE 4C-continued

| Examplary Embodiment | RMS pulse broadening at 850 nm, ns/km | RMS pulse broadening at 980 nm, ns/km | RMS pulse broadening at 1300 nm, ns/km | BW at 850 nm, GHz-km | BW at 980 nm, GHz-km | BW at 1300 nm, GHz-km |
|---|---|---|---|---|---|---|
| 31 | 0.0140 | 0.0194 | 0.0944 | 13.3 | 9.6 | 2.0 |
| 32 | 0.0140 | 0.0181 | 0.1044 | 13.3 | 10.3 | 1.8 |
| 33 | 0.0140 | 0.0212 | 0.1183 | 13.3 | 8.8 | 1.6 |
| 34 | 0.0141 | 0.0495 | 0.1386 | 13.2 | 3.8 | 1.3 |
| 35 | 0.0140 | 0.0279 | 0.1678 | 13.3 | 6.7 | 1.1 |
| 36 | 0.0141 | 0.0247 | 0.0973 | 13.3 | 7.6 | 1.9 |
| 37 | 0.0140 | 0.0194 | 0.0944 | 13.3 | 9.6 | 2.0 |
| 38 | 0.0140 | 0.0181 | 0.1044 | 13.3 | 10.3 | 1.8 |
| 39 | 0.0140 | 0.0212 | 0.1183 | 13.3 | 8.8 | 1.6 |
| 40 | 0.0141 | 0.0495 | 0.1386 | 13.2 | 3.8 | 1.3 |
| 41 | 0.0140 | 0.0279 | 0.1678 | 13.3 | 6.7 | 1.1 |
| 42 | 0.0141 | 0.0247 | 0.0973 | 13.3 | 7.6 | 1.9 |
| 43 | 0.0140 | 0.0194 | 0.0944 | 13.3 | 9.6 | 2.0 |
| 44 | 0.0140 | 0.0181 | 0.1044 | 13.3 | 10.3 | 1.8 |
| 45 | 0.0140 | 0.0212 | 0.1183 | 13.3 | 8.8 | 1.6 |
| 46 | 0.0141 | 0.0495 | 0.1386 | 13.2 | 3.8 | 1.3 |
| 47 | 0.0140 | 0.0279 | 0.1678 | 13.3 | 6.7 | 1.1 |
| 48 | 0.0141 | 0.0247 | 0.0973 | 13.3 | 7.6 | 1.9 |
| 49 | 0.0140 | 0.0194 | 0.0944 | 13.3 | 9.6 | 2.0 |
| 50 | 0.0140 | 0.0181 | 0.1044 | 13.3 | 10.3 | 1.8 |
| 51 | 0.0140 | 0.0212 | 0.1183 | 13.3 | 8.8 | 1.6 |

Third Set of Exemplary Embodiments

Various additional embodiments of the Ge-F co-doped fibers will be further clarified by the following modeled exemplary embodiments 52-101 (Tables 1D, 2D, 3D and 4D).

More specifically, in the fiber embodiments with Ge-F co-doped cores, germania is disposed in the core 20 of the graded index multimode optical fiber 10 with a germania dopant concentration profile, $C_{Ge}(r)$ (i.e., $C_a(r)=C_{Ge}(r)$). The core 20 has a center germania concentration at the centerline, $C_{a1}=C_{Ge1}$, greater than or equal to 0, and an outermost germania concentration, $C_{G2}$, at $R_1$, wherein $C_{Ge2}$ is greater than or equal to 0. The fluorine (F) is disposed in the core 20 of the graded index multimode optical fiber 10 with a fluorine dopant concentration profile, $C_F(r)$—i.e., (i.e., $C_{c-d}(r)=C_F(r)$). The graded index core 20 has a center fluorine concentration at the centerline, $C_{c-d1}=C_{F1}$, greater than or equal to 0, and may have an outermost fluorine concentration $C_{F2}$, at $R_1$, wherein $C_{F2}$ is greater than or equal to 0, depending on the profile of fluorine concentration $C_F(r)$ within the core. In some embodiments, germania is present at the centerline and fluorine is not, i.e. $C_{G1}$ is greater than 0 and $C_{F1}$ is equal to 0. In some embodiments, fluorine is present at $R_1$ and germania is not, i.e. $C_{F2}$ is greater than 0 and $C_{G2}$ is equal to 0.

Preferably, $C_{Ge}(r)$ decreases with increasing radius from r=0 to r=$R_1$, and $C_F(r)$ increases with increasing radius from r=0 to r=$R_1$. More preferably, $C_{Ge}(r)$ monotonically decreases with increasing radius from r=0 to r=$R_1$, and $C_F(r)$ monotonically increases with increasing radius from r=0 to r=$R_1$. Still more preferably, $C_{Ge}(r)$ monotonically decreases with increasing radius from r=0 to r=$R_1$, and $C_{Ge1}$ is nonzero, and $C_F(r)$ monotonically increases with increasing radius from r=0 to r=$R_1$, and at least one of $C_{F2}$ is non zero. Fiber embodiments 52-101 have a down-doped region 50 situated in cladding 200. Region 50 surrounds the core and has a refractive index lower than that of outer cladding layer 60.

In these exemplary embodiments some of the fiber parameters are the same, i.e., the relative refractive index of the core (relative to pure silica) is 1%, the outer radius $R_1$ of the core 20 is 25 μm, the outer radius $R_2$ of the inner cladding layer 30 is 26.2 μm, the radius of the outer cladding $R_4$=26.2 μm. In the embodiments 12-38 the minimum refractive index delta of the cladding layer 50 (moat) was −0.45. For these embodiments $x_1$, $x_2$ values are 0.1≤$x_1$≤1 and 0.1≤$x_2$≤1.

In fiber embodiments 52-101 of Tables 1D, 2D, 3D and 4D the concentration of germania $C_{Ge1}$ and fluorine $C_{F1}$ in the core, (and the outer radius $R_4$ of the cladding layer 50) were changed to observe the effect of the changes on fiber performance. The change in the outer radius $R_3$ affected the moat volume of the cladding. The changes in layer 50, which in turn resulted in changes in macrobend performance. Table 3D indicates that the bend performance of the multimode fibers 10 is better for fibers with larger the moat volume V (volume of region 50) which is defined in Eq. 17.

Accordingly, it is preferable that the moat value be greater than 30 μm²%, more preferably greater 50 μm²%, and even more preferably greater 100 μm²%, for example between 100 and 300 μm²%.

The changes in concentration of germania $C_{Ge1}$ and fluorine (F) $C_{F1}$ and the diameter of the core ($R_1$) affect the numerical aperture of the fiber, and also the center wavelength of the second operating window as well as the values for RMS pulse broadening and the bandwidth BW at various wavelengths. It is noted that the RMS pulse broadening is much smaller for fiber embodiments 52-101 than that for the comparative examples 1 and 2, and that the bandwidths BW at 980 nm and 1300 nm are also much larger than that of the comparative examples 1 and 2. This is shown in Tables 1D, 2D, 3D and 4D, below. Optical core diameter was not modeled for examples 90-101 (note A).

It is also noted that in other embodiments the relative refractive index of the core is higher or lower than 1%. For example, $\Delta_1$max may be 0.25% 0.3%, 0.5%, 0.7% or 1.1%, 1.5%, 2%, or anything therebetween.

TABLE 1D

| Examplary Embodiment | GeO$_2$ Concentration (mole %), C$_{Ge1}$ | GeO$_2$ Concentration (mole %), C$_{Ge2}$ | x$_1$ | Fluorine Concentration (mole %), C$_{B1}$ | Fluorine Concentration (mole %), C$_{B2}$ | x$_2$ | Moat (y/n) |
|---|---|---|---|---|---|---|---|
| 52 | 4.5 | 0 | −10 | 0 | 2.0 | −10 | y |
| 53 | 4.5 | 0 | −10 | 0 | 2.0 | −6 | y |
| 54 | 4.5 | 0 | −10 | 0 | 2.0 | −4 | y |
| 55 | 4.5 | 0 | −10 | 0 | 2.0 | −2 | y |
| 56 | 4.5 | 0 | −10 | 0 | 2.0 | 0 | y |
| 57 | 4.5 | 0 | −10 | 0 | 2.0 | 2 | y |
| 58 | 4.5 | 0 | −10 | 0 | 2.0 | 4 | y |
| 59 | 4.5 | 0 | −10 | 0 | 2.0 | 6 | y |
| 60 | 4.5 | 0 | −10 | 0 | 2.0 | −10 | y |
| 61 | 4.5 | 0 | −10 | 0 | 2.0 | −6 | y |
| 62 | 4.5 | 0 | −10 | 0 | 2.0 | −4 | y |
| 63 | 4.5 | 0 | −10 | 0 | 2.0 | −2 | y |
| 64 | 4.5 | 0 | −10 | 0 | 2.0 | 0 | y |
| 65 | 4.5 | 0 | −10 | 0 | 2.0 | 2 | y |
| 66 | 4.5 | 0 | −10 | 0 | 2.0 | 4 | y |
| 67 | 4.5 | 0 | −10 | 0 | 2.0 | 6 | y |
| 68 | 4.5 | 0 | −10 | 0 | 2.0 | 8 | y |
| 69 | 4.5 | 0 | −10 | 0 | 2.0 | 10 | y |
| 70 | 4.5 | 0 | −10 | 0 | 2.0 | −10 | y |
| 71 | 4.5 | 0 | −10 | 0 | 2.0 | −6 | y |
| 72 | 4.5 | 0 | −10 | 0 | 2.0 | −4 | y |
| 73 | 4.5 | 0 | −10 | 0 | 2.0 | −2 | y |
| 74 | 4.5 | 0 | −10 | 0 | 2.0 | 0 | y |
| 75 | 4.5 | 0 | −10 | 0 | 2.0 | 2 | y |
| 76 | 4.5 | 0 | −10 | 0 | 2.0 | 4 | y |
| 77 | 4.5 | 0 | −10 | 0 | 2.0 | 6 | y |
| 78 | 4.5 | 0 | −10 | 0 | 2.0 | 8 | y |
| 79 | 4.5 | 0 | −10 | 0 | 2.0 | 10 | y |
| 80 | 4.5 | 0 | −10 | 0 | 2.0 | −10 | y |
| 81 | 4.5 | 0 | −10 | 0 | 2.0 | −6 | y |
| 82 | 4.5 | 0 | −10 | 0 | 2.0 | −4 | y |
| 83 | 4.5 | 0 | −10 | 0 | 2.0 | −2 | y |
| 84 | 4.5 | 0 | −10 | 0 | 2.0 | 0 | y |
| 85 | 4.5 | 0 | −10 | 0 | 2.0 | 2 | y |
| 86 | 4.5 | 0 | −10 | 0 | 2.0 | 4 | y |
| 87 | 4.5 | 0 | −10 | 0 | 2.0 | 6 | y |
| 88 | 4.5 | 0 | −10 | 0 | 2.0 | 8 | y |
| 89 | 4.5 | 0 | −10 | 0 | 2.0 | 10 | y |
| 90 | 8.22 | 0 | 0.5 | 0 | 0.5 | 0.5 | y |
| 91 | 6.80 | 0 | 0.5 | 0 | 1.0 | 0.5 | y |
| 92 | 5.58 | 0 | 0.5 | 0 | 1.5 | 0.5 | y |
| 93 | 8.22 | 0 | 0.5 | 0 | 0.5 | 0.5 | y |
| 94 | 6.80 | 0 | 0.5 | 0 | 1.0 | 0.5 | y |
| 95 | 5.58 | 0 | 0.5 | 0 | 1.5 | 0.5 | y |
| 96 | 8.22 | 0 | 0.5 | 0 | 0.5 | 0.5 | y |
| 97 | 6.80 | 0 | 0.5 | 0 | 1.0 | 0.5 | y |
| 98 | 5.58 | 0 | 0.5 | 0 | 1.5 | 0.5 | y |
| 99 | 8.22 | 0 | 0.5 | 0 | 0.5 | 0.5 | y |
| 100 | 6.80 | 0 | 0.5 | 0 | 1.0 | 0.5 | y |
| 101 | 5.58 | 0 | 0.5 | 0 | 1.5 | 0.5 | y |

TABLE 2D

| Examplary Embodiment | alpha$_1$ at 850 nm | alpha$_2$ at 850 nm | R$_1$, μm | R$_2$, R$_3$, μm | R$_4$, μm | R$_{max}$, μm | Delta-3Min, % |
|---|---|---|---|---|---|---|---|
| 52 | 3.041 | 2.212 | 25 | 26.2 | 28.2 | 62.5 | −0.45 |
| 53 | 1.995 | 1.920 | 25 | 26.2 | 28.2 | 62.5 | −0.45 |
| 54 | 2.026 | 2.006 | 25 | 26.2 | 28.2 | 62.5 | −0.45 |
| 55 | 2.040 | 2.032 | 25 | 26.2 | 28.2 | 62.5 | −0.45 |
| 56 | 2.049 | 2.045 | 25 | 26.2 | 28.2 | 62.5 | −0.45 |
| 57 | 2.055 | 2.052 | 25 | 26.2 | 28.2 | 62.5 | −0.45 |
| 58 | 2.059 | 2.057 | 25 | 26.2 | 28.2 | 62.5 | −0.45 |
| 59 | 2.061 | 2.061 | 25 | 26.2 | 28.2 | 62.5 | −0.45 |
| 60 | 3.041 | 2.212 | 25 | 26.2 | 29.4 | 62.5 | −0.45 |
| 61 | 1.995 | 1.920 | 25 | 26.2 | 29.4 | 62.5 | −0.45 |
| 62 | 2.026 | 2.006 | 25 | 26.2 | 29.4 | 62.5 | −0.45 |
| 63 | 2.040 | 2.032 | 25 | 26.2 | 29.4 | 62.5 | −0.45 |
| 64 | 2.049 | 2.045 | 25 | 26.2 | 29.4 | 62.5 | −0.45 |
| 65 | 2.055 | 2.052 | 25 | 26.2 | 29.4 | 62.5 | −0.45 |
| 66 | 2.059 | 2.057 | 25 | 26.2 | 29.4 | 62.5 | −0.45 |
| 67 | 2.061 | 2.061 | 25 | 26.2 | 29.4 | 62.5 | −0.45 |
| 68 | 2.064 | 2.063 | 25 | 26.2 | 29.4 | 62.5 | −0.45 |
| 69 | 2.066 | 2.066 | 25 | 26.2 | 29.4 | 62.5 | −0.45 |
| 70 | 3.041 | 2.212 | 25 | 26.2 | 31.6 | 62.5 | −0.45 |
| 71 | 1.995 | 1.920 | 25 | 26.2 | 31.6 | 62.5 | −0.45 |
| 72 | 2.026 | 2.006 | 25 | 26.2 | 31.6 | 62.5 | −0.45 |
| 73 | 2.040 | 2.032 | 25 | 26.2 | 31.6 | 62.5 | −0.45 |
| 74 | 2.049 | 2.045 | 25 | 26.2 | 31.6 | 62.5 | −0.45 |
| 75 | 2.055 | 2.052 | 25 | 26.2 | 31.6 | 62.5 | −0.45 |
| 76 | 2.059 | 2.057 | 25 | 26.2 | 31.6 | 62.5 | −0.45 |
| 77 | 2.061 | 2.061 | 25 | 26.2 | 31.6 | 62.5 | −0.45 |
| 78 | 2.064 | 2.063 | 25 | 26.2 | 31.6 | 62.5 | −0.45 |
| 79 | 2.066 | 2.066 | 25 | 26.2 | 31.6 | 62.5 | −0.45 |
| 80 | 3.041 | 2.212 | 25 | 26.2 | 33.6 | 62.5 | −0.45 |
| 81 | 1.995 | 1.920 | 25 | 26.2 | 33.6 | 62.5 | −0.45 |
| 82 | 2.026 | 2.006 | 25 | 26.2 | 33.6 | 62.5 | −0.45 |
| 83 | 2.040 | 2.032 | 25 | 26.2 | 33.6 | 62.5 | −0.45 |

TABLE 2D-continued

| Examplary Embodiment | alpha$_1$ at 850 nm | alpha$_2$ at 850 nm | R$_1$, μm | R$_2$, R$_3$, μm | R$_4$, μm | R$_{max}$, μm | Delta-3Min, % |
|---|---|---|---|---|---|---|---|
| 84 | 2.049 | 2.045 | 25 | 26.2 | 33.6 | 62.5 | −0.45 |
| 85 | 2.055 | 2.052 | 25 | 26.2 | 33.6 | 62.5 | −0.45 |
| 86 | 2.059 | 2.057 | 25 | 26.2 | 33.6 | 62.5 | −0.45 |
| 87 | 2.061 | 2.061 | 25 | 26.2 | 33.6 | 62.5 | −0.45 |
| 88 | 2.064 | 2.063 | 25 | 26.2 | 33.6 | 62.5 | −0.45 |
| 89 | 2.066 | 2.066 | 25 | 26.2 | 33.6 | 62.5 | −0.45 |
| 90 | 2.064 | 2.064 | 25 | 26.2 | 28.2 | 62.5 | −0.45 |
| 91 | 2.064 | 2.064 | 25 | 26.2 | 28.2 | 62.5 | −0.45 |
| 92 | 2.065 | 2.065 | 25 | 26.2 | 28.2 | 62.5 | −0.45 |
| 93 | 2.064 | 2.064 | 25 | 26.2 | 29.4 | 62.5 | −0.45 |
| 94 | 2.064 | 2.064 | 25 | 26.2 | 29.4 | 62.5 | −0.45 |
| 95 | 2.065 | 2.065 | 25 | 26.2 | 29.4 | 62.5 | −0.45 |
| 96 | 2.064 | 2.064 | 25 | 26.2 | 31.6 | 62.5 | −0.45 |
| 97 | 2.064 | 2.064 | 25 | 26.2 | 31.6 | 62.5 | −0.45 |
| 98 | 2.065 | 2.065 | 25 | 26.2 | 31.6 | 62.5 | −0.45 |
| 99 | 2.064 | 2.064 | 25 | 26.2 | 33.6 | 62.5 | −0.45 |
| 100 | 2.064 | 2.064 | 25 | 26.2 | 33.6 | 62.5 | −0.45 |
| 101 | 2.065 | 2.065 | 25 | 26.2 | 33.6 | 62.5 | −0.45 |

In these embodiments R$_2$ = R$_3$

TABLE 3D

| Examplary Embodiment | Wavelength of first window at RMS minimum, nm | Wavelength of second window at RMS minimum, nm | Moat Volume (V), %-μm$^2$ | Bend loss at 850 nm, 10 mm diameter mandrel, dB/turn | Numerical Aperture | Optical Core Diameter μm |
|---|---|---|---|---|---|---|
| 52 | 850 | 1090 | 50 | 0.29 | 0.201 | 51.5 |
| 53 | 850 | 1090 | 50 | 0.29 | 0.201 | 51.5 |
| 54 | 850 | 1090 | 50 | 0.29 | 0.201 | 51.5 |
| 55 | 850 | 1090 | 50 | 0.29 | 0.201 | 51.5 |
| 56 | 850 | 1090 | 50 | 0.29 | 0.201 | 51.5 |
| 57 | 850 | 1090 | 50 | 0.29 | 0.201 | 51.5 |
| 58 | 850 | 1090 | 50 | 0.29 | 0.201 | 51.5 |
| 59 | 850 | 1090 | 50 | 0.29 | 0.201 | 51.5 |
| 60 | 850 | 1090 | 80 | 0.15 | 0.206 | 50.4 |
| 61 | 850 | 1090 | 80 | 0.15 | 0.206 | 50.4 |
| 62 | 850 | 1090 | 80 | 0.15 | 0.206 | 50.4 |
| 63 | 850 | 1090 | 80 | 0.15 | 0.206 | 50.4 |
| 64 | 850 | 1090 | 80 | 0.15 | 0.206 | 50.4 |
| 65 | 850 | 1090 | 80 | 0.15 | 0.206 | 50.4 |
| 66 | 850 | 1090 | 80 | 0.15 | 0.206 | 50.4 |
| 67 | 850 | 1090 | 80 | 0.15 | 0.206 | 50.4 |
| 68 | 850 | 1090 | 80 | 0.15 | 0.206 | 50.4 |
| 69 | 850 | 1090 | 80 | 0.15 | 0.206 | 50.4 |
| 70 | 850 | 1090 | 140 | 0.04 | 0.215 | 48.2 |
| 71 | 850 | 1090 | 140 | 0.04 | 0.215 | 48.2 |
| 72 | 850 | 1090 | 140 | 0.04 | 0.215 | 48.2 |
| 73 | 850 | 1090 | 140 | 0.04 | 0.215 | 48.2 |
| 74 | 850 | 1090 | 140 | 0.04 | 0.215 | 48.2 |
| 75 | 850 | 1090 | 140 | 0.04 | 0.215 | 48.2 |
| 76 | 850 | 1090 | 140 | 0.04 | 0.215 | 48.2 |
| 77 | 850 | 1090 | 140 | 0.04 | 0.215 | 48.2 |
| 78 | 850 | 1090 | 140 | 0.04 | 0.215 | 48.2 |
| 79 | 850 | 1090 | 140 | 0.04 | 0.215 | 48.2 |
| 80 | 850 | 1090 | 200 | 0.01 | 0.223 | 45.9 |
| 81 | 850 | 1090 | 200 | 0.01 | 0.223 | 45.9 |
| 82 | 850 | 1090 | 200 | 0.01 | 0.223 | 45.9 |
| 83 | 850 | 1090 | 200 | 0.01 | 0.223 | 45.9 |
| 84 | 850 | 1090 | 200 | 0.01 | 0.223 | 45.9 |
| 85 | 850 | 1090 | 200 | 0.01 | 0.223 | 45.9 |
| 86 | 850 | 1090 | 200 | 0.01 | 0.223 | 45.9 |
| 87 | 850 | 1090 | 200 | 0.01 | 0.223 | 45.9 |
| 88 | 850 | 1090 | 200 | 0.01 | 0.223 | 45.9 |
| 89 | 850 | 1090 | 200 | 0.01 | 0.223 | 45.9 |
| 90 | 850 | >1700 | 50 | 0.29 | 0.2 | note A |
| 91 | 850 | >1700 | 50 | 0.29 | 0.2 | note A |
| 92 | 850 | 1570 | 50 | 0.29 | 0.2 | note A |
| 93 | 850 | >1700 | 80 | 0.15 | 0.2 | note A |
| 94 | 850 | >1700 | 80 | 0.15 | 0.2 | note A |
| 95 | 850 | 1570 | 80 | 0.15 | 0.2 | note A |
| 96 | 850 | >1700 | 140 | 0.04 | 0.2 | note A |
| 97 | 850 | >1700 | 140 | 0.04 | 0.2 | note A |
| 98 | 850 | 1570 | 140 | 0.04 | 0.2 | note A |
| 99 | 850 | >1700 | 200 | 0.01 | 0.2 | note A |
| 100 | 850 | >1700 | 200 | 0.01 | 0.2 | note A |
| 101 | 850 | 1570 | 200 | 0.01 | 0.2 | note A |

Note A:
Optical core diameter was not modeled for examples 90-101.

TABLE 4D

| Examplary Embodiment | RMS pulse broadening at 850 nm, ns/km | RMS pulse broadening at 980 nm, ns/km | RMS pulse broadening at 1300 nm, ns/km | BW at 850 nm, GHz-km | BW at 980 nm, GHz-km | BW at 1300 nm, GHz-km |
|---|---|---|---|---|---|---|
| 52 | 0.0148 | 0.0746 | 0.2348 | 12.6 | 2.5 | 0.8 |
| 53 | 0.0149 | 0.0231 | 0.0423 | 12.5 | 8.1 | 4.4 |
| 54 | 0.0149 | 0.0189 | 0.0447 | 12.5 | 9.9 | 4.2 |
| 55 | 0.0149 | 0.0181 | 0.0458 | 12.5 | 10.3 | 4.1 |
| 56 | 0.0149 | 0.0178 | 0.0462 | 12.5 | 10.5 | 4.0 |
| 57 | 0.0149 | 0.0177 | 0.0463 | 12.5 | 10.5 | 4.0 |
| 58 | 0.0149 | 0.0177 | 0.0464 | 12.5 | 10.6 | 4.0 |
| 59 | 0.0149 | 0.0176 | 0.0464 | 12.5 | 10.6 | 4.0 |
| 60 | 0.0148 | 0.0746 | 0.2348 | 12.6 | 2.5 | 0.8 |
| 61 | 0.0149 | 0.0231 | 0.0423 | 12.5 | 8.1 | 4.4 |
| 62 | 0.0149 | 0.0189 | 0.0447 | 12.5 | 9.9 | 4.2 |
| 63 | 0.0149 | 0.0181 | 0.0458 | 12.5 | 10.3 | 4.1 |
| 64 | 0.0149 | 0.0178 | 0.0462 | 12.5 | 10.5 | 4.0 |
| 65 | 0.0149 | 0.0177 | 0.0463 | 12.5 | 10.5 | 4.0 |
| 66 | 0.0149 | 0.0177 | 0.0464 | 12.5 | 10.6 | 4.0 |
| 67 | 0.0149 | 0.0176 | 0.0464 | 12.5 | 10.6 | 4.0 |
| 68 | 0.0149 | 0.0176 | 0.0465 | 12.5 | 10.6 | 4.0 |
| 69 | 0.0149 | 0.0176 | 0.0465 | 12.5 | 10.6 | 4.0 |
| 70 | 0.0148 | 0.0746 | 0.2348 | 12.6 | 2.5 | 0.8 |
| 71 | 0.0149 | 0.0231 | 0.0423 | 12.5 | 8.1 | 4.4 |
| 72 | 0.0149 | 0.0189 | 0.0447 | 12.5 | 9.9 | 4.2 |
| 73 | 0.0149 | 0.0181 | 0.0458 | 12.5 | 10.3 | 4.1 |
| 74 | 0.0149 | 0.0178 | 0.0462 | 12.5 | 10.5 | 4.0 |
| 75 | 0.0149 | 0.0177 | 0.0463 | 12.5 | 10.5 | 4.0 |
| 76 | 0.0149 | 0.0177 | 0.0464 | 12.5 | 10.6 | 4.0 |
| 77 | 0.0149 | 0.0176 | 0.0464 | 12.5 | 10.6 | 4.0 |
| 78 | 0.0149 | 0.0176 | 0.0465 | 12.5 | 10.6 | 4.0 |
| 79 | 0.0149 | 0.0176 | 0.0465 | 12.5 | 10.6 | 4.0 |
| 80 | 0.0148 | 0.0746 | 0.2348 | 12.6 | 2.5 | 0.8 |
| 81 | 0.0149 | 0.0231 | 0.0423 | 12.5 | 8.1 | 4.4 |
| 82 | 0.0149 | 0.0189 | 0.0447 | 12.5 | 9.9 | 4.2 |
| 83 | 0.0149 | 0.0181 | 0.0458 | 12.5 | 10.3 | 4.1 |
| 84 | 0.0149 | 0.0178 | 0.0462 | 12.5 | 10.5 | 4.0 |
| 85 | 0.0149 | 0.0177 | 0.0463 | 12.5 | 10.5 | 4.0 |
| 86 | 0.0149 | 0.0177 | 0.0464 | 12.5 | 10.6 | 4.0 |
| 87 | 0.0149 | 0.0176 | 0.0464 | 12.5 | 10.6 | 4.0 |
| 88 | 0.0149 | 0.0176 | 0.0465 | 12.5 | 10.6 | 4.0 |
| 89 | 0.0149 | 0.0176 | 0.0465 | 12.5 | 10.6 | 4.0 |
| 90 | 0.0141 | 0.0726 | 0.1497 | 13.3 | 2.6 | 1.2 |
| 91 | 0.0140 | 0.0508 | 0.0819 | 13.3 | 3.7 | 2.3 |
| 92 | 0.0138 | 0.0377 | 0.0414 | 13.5 | 4.9 | 4.5 |
| 93 | 0.0141 | 0.0726 | 0.1497 | 13.3 | 2.6 | 1.2 |
| 94 | 0.0140 | 0.0508 | 0.0819 | 13.3 | 3.7 | 2.3 |
| 95 | 0.0138 | 0.0377 | 0.0414 | 13.5 | 4.9 | 4.5 |
| 96 | 0.0141 | 0.0726 | 0.1497 | 13.3 | 2.6 | 1.2 |
| 97 | 0.0140 | 0.0508 | 0.0819 | 13.3 | 3.7 | 2.3 |
| 98 | 0.0138 | 0.0377 | 0.0414 | 13.5 | 4.9 | 4.5 |
| 99 | 0.0141 | 0.0726 | 0.1497 | 13.3 | 2.6 | 1.2 |
| 100 | 0.0140 | 0.0508 | 0.0819 | 13.3 | 3.7 | 2.3 |
| 101 | 0.0138 | 0.0377 | 0.0414 | 13.5 | 4.9 | 4.5 |

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A graded index multimode optical fiber comprising:
   (a) a core comprising silica doped with germania and at least one co-dopant, c-d, the co-dopant comprising one of $P_2O_5$ or F or $B_2O_3$, the core extending from a centerline at r=0 to an outermost core radius, $r_1$ and having a dual alpha, $\alpha_1$ and $\alpha$;
   (b) an inner cladding surrounding and in contact with the core;
   (c) an outer cladding surrounding and in contact with the inner cladding, at least one region of the inner cladding having a lower refractive index than the outer cladding and being off-set from said core; and the germania is disposed in the core with a germania dopant concentration profile, $C_{Ge1}(r)$, and the core has a center germania concentration at the centerline, $C_{Ge1}$, greater than or equal to 0, and an outermost germania concentration $C_{Ge2}$, at $r_1$, wherein $C_{Ge2}$, is greater than or equal to 0; and wherein the co-dopant is disposed in the core with a co-dopant concentration profile, $C_{c-d}(r)$, and the core has a center co-dopant concentration at the centerline, $C_{c-d1}$, greater than or equal to 0, and an outermost co-dopant concentration $C_{c-d2}$, at $r_1$, wherein $C_{c-d2}$ is greater than or equal to 0; and $C_{Ge}(r)=C_{Ge1}-(C_{Ge1}-C_{Ge2})(1-x_1)r^{\alpha 1}-(C_{Ge1}-C_{Ge2})x_1 r^{\alpha 2}$;
$C_{c-d}(r)=C_{c-d1}-(C_{c-d1}-C_{c-d2})x_2 r^{\alpha 1}-(C_{c-d1}-C_{c-d2})(1-x_2)r^2$;
$1.8<_1<2.4$, $1.8<\alpha_2<3.1$; and $-10<x_1<10$ and $-10<x_2<10$.

2. The optical fiber of claim 1 wherein the inner cladding region with the lower refractive index than the outer cladding that is off sett from the core includes random voids or comprised of silica doped with boron, fluorine, or co-doping of fluorine and germania.

3. The optical fiber of claim 1 wherein the concentration of fluorine at the centerline is essentially zero, and the concentration of fluorine increases with radius within the core.

4. The optical fiber of claim 3 wherein the concentration of germania at $r_0$ ranges from about 1 and about 11.5 mole %.

5. The optical fiber of claim 1 wherein the bandwidth is >750 MHz-Km at about 850 nm.

6. The optical fiber of claim 1 wherein the bandwidth is >1500 MHz-Km at about 850 nm.

7. The optical fiber of claim 1 wherein the bandwidth is >1500 MHz-Km at about 980 nm.

8. The optical fiber of claim 1 wherein the bandwidth is >500 MHz-Km at about 1300 nm.

9. The optical fiber of claim 1 where the restricted launch bend loss at 850 nm is less than 1.5 dB/turn.

10. The optical fiber of claim 1 where the restricted launch bend loss at 850 nm is less than 0.25 dB/turn.

11. The optical fiber of claim 1 where the volume average F concentration in the core region is at least 0.25 wt %.

12. The optical fiber of claim 2 where the volume average Ge concentration in the moat region is at least 0.5 wt %.

13. The optical fiber of claim 1 where the core are separated by at least 0.5 um from the portion of the inner cladding having a lower refractive index than the outer cladding.

14. The optical fiber of claim 2 wherein the inner cladding region having a lower refractive index than the outer cladding comprises fluorine and the volume of fluorine is greater than 30 μm²%.

15. The optical fiber of claim 2 wherein the inner cladding region having a lower refractive index than the outer cladding comprises fluorine and the volume of fluorine is greater than 100 and less than 300 μm²%.

16. A graded index multimode optical fiber comprising:
(a) a core comprising silica doped with germania and at least one co-dopant, c-d, the co-dopant comprising $B_2O_3$, the core extending from a centerline at r=0 to an outermost core radius, $r_1$ and having a dual alpha, $\alpha_1$ and $\alpha$;
(b) an inner cladding surrounding and in contact with the core;
(c) an outer cladding surrounding and in contact with the inner cladding, at least one region of the inner cladding having a lower refractive index than the outer cladding; and
the germania is disposed in the core with a germania dopant concentration profile, $C_{Ge1}(r)$, and the core has a center germania concentration at the centerline, $C_{Ge1}$, greater than or equal to 0, and an outermost germania concentration $C_{Ge2}$, at $r_1$, wherein $C_{Ge2}$, is greater than or equal to 0; and
wherein the co-dopant is disposed in the core with a co-dopant concentration profile, $C_{c-d}(r)$, and the core has a center co-dopant concentration at the centerline, $C_{c-d1}$, greater than or equal to 0, and an outermost co-dopant concentration $C_{e-d2}$, at $r_1$, wherein $C_{c-d2}$ is greater than or equal to 0; and
$C_{Ge}(r)=C_{Ge1}-(C_{Ge1}-C_{Ge2})(1-x_1)r^{\alpha 1}-(C_{Ge1}-C_{Ge2})x_1 r^{\alpha 2}$;
$C_{c-d}(r)=C_{c-d1}-(C_{c-d1}-C_{c-d2})x_2 r^{\alpha 1}-(C_{c-d1}-C_{c-d2})(1-x_2)r^2$;
$1.8<_1<2.4$, $1.8<\alpha_2<3.1$; and $-10<x_1<10$ and $-10<x_2<10$.

17. The optical fiber of claim 16 wherein the inner cladding region with the lower refractive index than the outer cladding includes random voids or comprised of silica doped with boron, fluorine, or co-doping of fluorine and germania.

18. The optical fiber of claim 1 wherein the bandwidth BW satisfyes at least one of the following conditions:
(i) BW>1500 MHz-Km at about 850 nm;
(ii) BW>1500 MHz-Km at about 980 nm;
(iii) BW>500 MHz-Km at about 1300 nm; or (ii)

19. The optical fiber of claim 16 wherein the concentration of germania at $r_0$ ranges from about 1 and about 11.5 mole %.

20. The optical fiber of claim 16 wherein the bandwidth is >750 MHz-Km at about 850 nm.

* * * * *